United States Patent
Ohtani et al.

(10) Patent No.: US 7,191,399 B2
(45) Date of Patent: Mar. 13, 2007

(54) ELECTRONIC INFORMATION DISPLAY APPARATUS, ELECTRONIC INFORMATION DISPLAY METHOD, RECORDING MEDIUM, AND PROGRAM

(75) Inventors: Hisao Ohtani, Kanagawa (JP); Takeshi Kanai, Saitama (JP); Yoshitaka Ukita, Tokyo (JP)

(73) Assignee: Sony Corporation, Tokyo (JP)

( * ) Notice: Subject to any disclaimer, the term of this patent is extended or adjusted under 35 U.S.C. 154(b) by 449 days.

(21) Appl. No.: 10/685,482

(22) Filed: Oct. 16, 2003

(65) Prior Publication Data

US 2004/0148574 A1 Jul. 29, 2004

(30) Foreign Application Priority Data

Oct. 18, 2002 (JP) ............................. 2002-304264

(51) Int. Cl.
*G06F 15/00* (2006.01)
*G06F 17/00* (2006.01)
(52) U.S. Cl. ..................... 715/517; 715/702; 715/730; 709/217
(58) Field of Classification Search ................ 715/517, 715/702, 730; 709/217
See application file for complete search history.

(56) References Cited

U.S. PATENT DOCUMENTS

2002/0091738 A1* 7/2002 Rohrabaugh et al. ....... 707/517
2004/0021681 A1* 2/2004 Liao ............................ 345/702
2004/0145603 A1* 7/2004 Soares ......................... 345/730

FOREIGN PATENT DOCUMENTS

| JP | 10-178522 | 6/1998 |
| JP | 2001-249746 | 9/2001 |
| JP | 2001-282784 | 10/2001 |
| JP | 2003-132071 | 5/2003 |

OTHER PUBLICATIONS

Bjorl et al. "WEST: A Web Browser for Small Terminals" Published by ACM 1999 pp. 187-196.*

* cited by examiner

*Primary Examiner*—William Bashore
(74) *Attorney, Agent, or Firm*—Oblon, Spivak, McClelland, Maier & Neustadt, P.C.

(57) ABSTRACT

The present invention is intended to display page space layout images substantially similar to the page space images of actual newspapers and magazines and, on the basis of these images, display news items having legible character size. Display blocks for displaying images based on the electronic information having the image information of a page space having a plurality of news items and the news-item contents information associated with each news item and operation means such as a jog lever are arranged. Page space images of a newspaper for example are displayed on these display block and news-item markers corresponding to news items are displayed. When the news-item marker corresponding to a desired news item is selected, an image of the news-item contents information associated with the news-item indicated by the displayed news-item marker is displayed on the display block.

25 Claims, 26 Drawing Sheets

ELECTRONIC INFORMATION DISPLAY APPARATUS, ELECTRONIC INFORMATION DISPLAY METHOD, RECORDING MEDIUM, AND PROGRAM

BACKGROUND OF THE INVENTION

The present invention relates generally to an electronic information display apparatus, an electronic information display method, a program, and a recording medium that are intended to display electronic information such as newspapers and magazines.

For example, some of the display apparatuses such as mobile information processing terminal apparatuses capture the electronic information of newspapers and magazines and display the captured electronic information on a display device. In the case of mobile information terminal apparatuses, their display screens are inherently limited in size, so that the electronic information is displayed on smaller screens than those of actual newspapers and magazines. Consequently, if the page space images of newspapers and magazines are displayed as they are, the letters become too small to be legible.

To overcome this problem, related-art technologies link text-form headers with text-form news items as with electronic bookstores and general Web newspaper sites to display the text-form headers as well as the news items linked with selected headers.

However, with actual newspapers and magazines, the information is laid out such that the readers can understand at a glance which news items are most important or which news items are currently much talked about. Therefore, it is essential to consider the page space layouts when displaying the information contained in newspapers and magazines onto information terminal apparatuses.

In the above-mentioned conventional technologies, however, only a list of headers in text form is displayed without the page space images of newspapers and magazines, so that it is difficult for the readers to understand by intuition the weighting of the news items on newspapers and magazines.

Some other technologies allow the readers to select desired news items from the page space images of the electronic information (refer to patent document 1 and patent document 2 below for example). For example, the technology disclosed in patent document 1 displays desired positions on each paper space image in a zoom-in manner by use of the zoom-in capability having a variable zoom-in ratio, thereby displaying enlarged electronic information in the magnified area. The technology disclosed in patent document 2 displays the frame of an news item area as a page space image and, when this portion is selected by a touch pad operation for example, displays the contents of the news item in this portion.

Patent document 1: Japanese Patent Laid-open No. 2001-249746

Patent document 2: Japanese Patent Laid-open No. Hei 8-265556

However, the technology disclosed in patent document 1, which displays a desired position in a page space of electronic information in a magnified manner involves a problem of having to move a desired position in each case to the zoom-in position. Especially, in the case of small mobile terminals, because of their small display screens, the area by which a position to be magnified is restricted, thereby making it difficult to specify a desired area to be read on a large page space image.

The technology disclosed in patent document 2, which allows the selection of a news item area by displaying the frame of that area displays the selected news item area as a page space but does not display the letters and photographs in that area as a page space image, thereby making it impossible for the readers to grasp the image of the news item as it is with the actual images of pages of newspapers and magazines.

SUMMARY OF THE INVENTION

It is therefore an object of the present invention to provide an electronic information display apparatus, an electronic information display method, a program, and a recording medium that are capable of displaying page space layout images similar to those of actual newspapers and magazines and, on the basis of displayed images, displaying news items of legible character size with a simple operation.

In carrying out the invention and according to one aspect thereof, there is provided an electronic information display apparatus including: a display element for displaying an image based on electronic information at least having image information of a page space having a plurality of partitions of news items and news-item contents information associated with each of the plurality of partitions of news items; an operation element for executing information display onto the display element; an image information display control element for displaying an image of the page space image information among the electronic information onto the display element ; a news-item marker display control element for displaying a plurality of news-item markers each corresponding to each of the news items in the page space image information displayed on the display element in response to an operation executed through the operation element ; and a news-item contents information display control element for, if desired one of the news-item markers is selected from among the displayed news-item markers by an operation executed through the operation element, displaying onto the display element an image of the news-item contents information associated with the news-item partition in which the selected news-item marker is displayed.

According to the above-mentioned electronic information display apparatus, the page space images of the electronic information of newspapers and magazines for example are displayed, news-item markers are displayed on each of the page space images, and the news-item contents indicated by a selected news-item marker are displayed separately from the page space image, so that news items having a legible character size may be displayed on the basis of the page space image by a simple, easy operation. Besides, the selection of news items may be executed by a simple operation of selecting news-item markers, so that desired news items may selectively displayed with ease even with a relatively small display screen of mobile information terminals for example. In addition, on the display screen, news-item markers may only be displayed on each page space image, so that a page space layout image substantially similar to that of an actual newspaper or magazine may be displayed as the page space image. Consequently, the text and photographs within each news-item partition may be displayed as they are, thereby allowing the reader to understand the weighting of each news-item at a glance.

In carrying out the invention and according to another aspect thereof, there is provided an electronic information display method including the steps of: image information displaying step for displaying, among electronic information at least having image information of a page space having a plurality of partitions of news items and news-item contents information associated with each of the plurality of partitions of news items, an image of the page space image information onto a display element; news-item marker display control step for displaying news-item markers each of the news items in the page space image information displayed on the display element in response to an operation executed through an operation element; and news-item contents information display control step for displaying, if desired one of the plurality of news-item markers is selected from among the plurality of displayed news-item markers by an operation executed through the operation element, onto the display element an image of the news-item contents information associated with the news-item partition in which the selected news-item marker is displayed. According to the above-mentioned electronic information display method, like the above-mentioned electronic information display apparatus, the substantially the same page space layout images as those of an actual newspaper or magazine may be displayed and, on the basis of each displayed layout image, news items having a legible character size may be displayed with a simple operation.

In the above-mentioned electronic information display apparatus or method, the news-item marker display control displays each of the plurality of news-item markers in each of the plurality of news-item partitions in the page space image information displayed on the display element and displays each of the plurality of news-item markers in the proximity of a header of each news item. Consequently, the news-item marker for that news-item partition may be understood at a glance, thereby further facilitating the selection of news items.

In the above-mentioned electronic information display apparatus or method, the operation element has a jog lever having a switch which is operated upward, downward, and in a push direction; the news-item marker display control displays the news-item markers when the jog lever is switched upward or downward with a screen based on the page space image information displayed on the display element and, every time the jog lever is switched upward or downward, shifts candidate selection display to another of the news-item markers with one of them displayed as a selection candidate; and the news-item contents information display control, when the jog lever is switched in the push direction, determines that the news-item marker displayed as selection candidate at that moment has been selected and displays the news-item contents information indicated by the selected news-item marker onto the display element. Consequently, the selection of news-item markers may be executed by the jog lever, thereby further facilitating the operation for displaying desired news items.

In the above-mentioned electronic information display apparatus or method, the operation element has a zoom-in button and a zoom-in display control which, when the zoom-in button is pressed with an image of the news-item contents information displayed on the display element by the news-item contents information display control, displays the image of the news-item content information in a magnified manner. Consequently, the readers may read the displayed text with ease.

In the above-mentioned electronic information display apparatus or method, the display element has two display screens and the image information display control displays images of the page space image information onto the two display screens in a two-page spread manner. Consequently, the electronic information may be displayed as if an actual newspaper or magazine were displayed in a two-page spread manner.

In the above-mentioned electronic information display apparatus or method, the news-item contents information display control displays the image of the news-item contents information onto one of the two display screens of the display element, which is other display screen from the display screen on which the news-item markers are displayed. Consequently, the page space image of a newspaper page and the contents of each news item in that page may be viewed at the same time, so that the reader may understand which partition's news-item contents of the newspaper displayed in a page space image are displayed while reading the news-item contents.

In the above-mentioned electronic information display apparatus or method, the operation element has a page-turning button and the image information display control, when the page-turning button is pressed, sequentially displays the images of the subsequent page space image information onto the two display screens in a two-page spread manner. Consequently, display made be executed as if pages of an actual newspaper or magazine were turned over.

In the above-mentioned electronic information display apparatus or method, the display element has one display screen and the news-item contents information display control displays a window in one portion of the display screen in the display element and displays an image of the news-item contents information into the window. Consequently, while displaying a page space image with news-item markers displayed, the window in which the selected news-item contents are displayed may be opened.

In the above-mentioned electronic information display apparatus, the electronic information is captured from a semiconductor memory or via a network. The electronic information display apparatus is a display apparatus of a mobile information terminal apparatus or a display apparatus of an electronic book.

In carrying out the invention according to still another aspect thereof, there is provided a computer-readable program for having a computer execute the steps of: displaying, among electronic information at least having image information of a page space having a plurality of partitions of news items and news-item contents information associated with each of the plurality of partitions of news items, an image of the page space image information onto a display element; displaying news-item markers each corresponding to each of the news items in the page space image information displayed on the display element in response to an operation executed through an operation element; and if desired one of the news-item markers is selected from among the plurality of displayed news-item markers by an operation executed through the operation element, displaying onto the display element an image of the news-item contents information associated with the news-item partition in which the selected news-item marker is displayed. Consequently, the computer may be made to function as a display apparatus which displays paper space layout images substantially similar to an actual newspaper or magazine and displays news items having a legible character size on the basis of the layout images by a simple operation, like the above-mentioned electronic information display apparatus.

In carrying out the invention and according to yet another aspect thereof, there is provided a recording medium recording a computer-readable program for displaying electronic information, the program has computer execute the steps of:

displaying, among electronic information at least having image information of a page space having a plurality of partitions of news items and news-item contents information associated with each of the plurality of partitions of news items, an image of the page space image information onto a display element; displaying news-item markers each corresponding to each of the news items in the page space image information displayed on the display element in response to an operation executed through an operation element; and if desired one of the news-item markers is selected from among the displayed news-item markers by an operation executed through the operation element, displaying onto the display element an image of the news-item contents information associated with the news-item partition in which the selected news-item marker is displayed. Consequently, the computer may be made to function as a display apparatus which displays paper space layout images substantially similar to an actual newspaper or magazine and displays news items having a legible character size on the basis of the layout images by a simple operation, like the above-mentioned electronic information display apparatus.

As described and according to the invention, the novel configuration may display page space layout images substantially similar to those of actual newspapers and magazines and, on the basis of the displayed images, display news-items of a legible character size with easy operations. Also, the novel configuration provides a new way of viewing newspapers and magazines in which news-items may be read while being aware of their page space images on mobile information terminal apparatuses such as PDAs and mobile phones which are inherently limited in the size of their display screens.

The above and other objects, features and advantages of the present invention will become apparent from the following description and appended claims, taken in conjunction with the accompanying drawings which show by way of example some preferred embodiments of the invention.

DETAILED DESCRIPTION OF PREFERRED EMBODIMENTS

Figure 1:
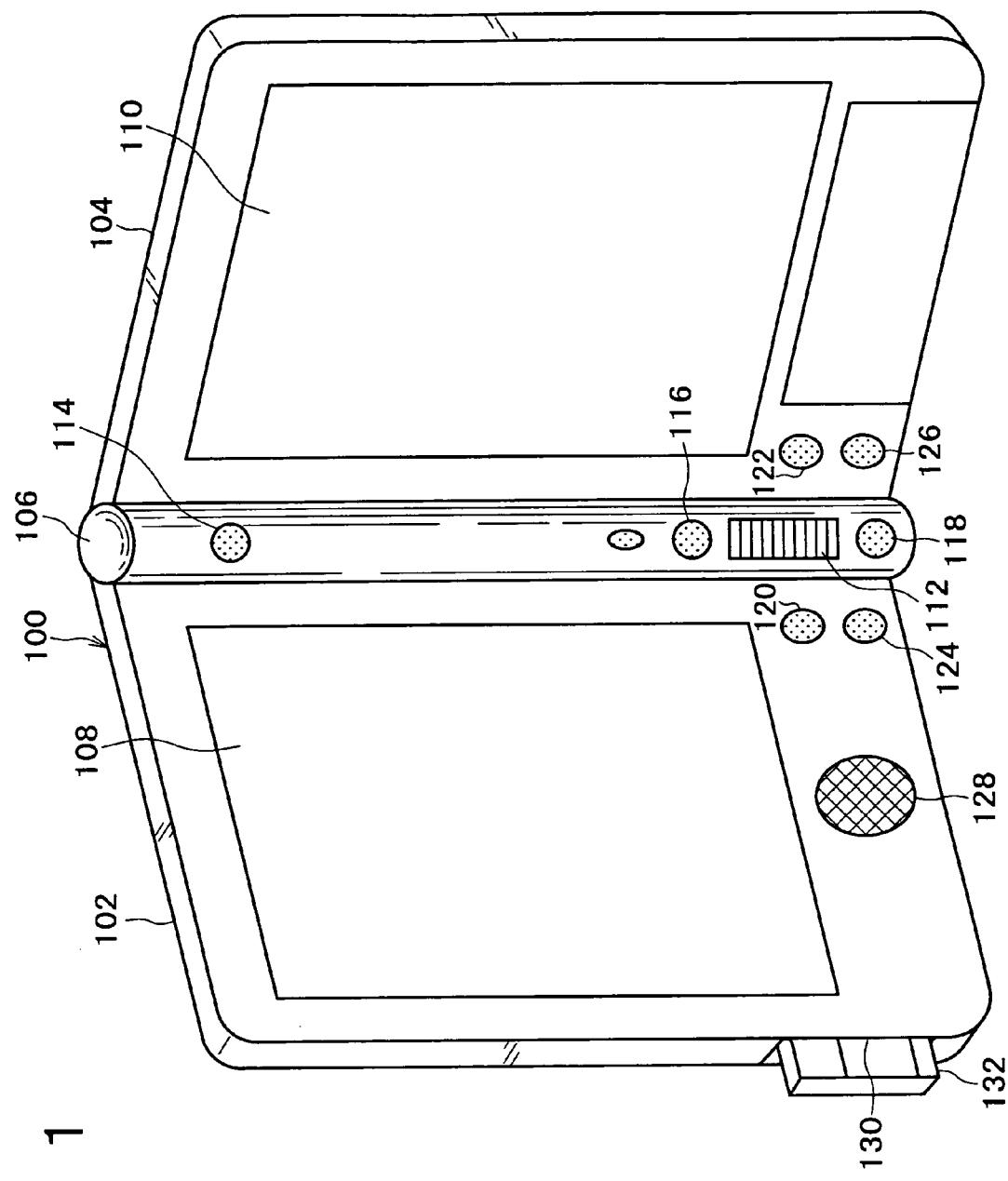
FIG. 1 is a perspective external view illustrating a mobile information terminal apparatus practiced as one embodiment of the invention.

The following describes a first embodiment of the present invention with reference to the accompanying drawings. Referring to FIG. 1, there is shown an external view of a mobile information terminal apparatus as one example of an electronic information display apparatus and, more particularly, there is shown in a mobile information terminal apparatus with its display blocks opened in a two-page spread manner.

<Configuration of the Mobile Information Terminal Apparatus>

A mobile information terminal apparatus 100 associated with the present embodiment has cases 102 and 104 each accommodating predetermined electronic circuits. These cases 102 and 104 are pivotally attached to each other by means of a pivot 106. This setup allows the cases 102 and 104 to open and close by means of the pivot 106 like an actual book is opened and closed.

On the insides of the cases 102 and 104, display blocks 108 and 110 are arranged respectively as one example of display means. The display block 108 is also referred to as a left-hand display block 108 because it is positioned on the left side of the user when the cases 102 and 104 are opened. Likewise, the display block 110 is also referred to as a right-hand display block 110 because it is positioned on the right side of the user when the cases 102 and 104 are opened. The display blocks 108 and 110 are each constituted by a liquid crystal display device for example. These display blocks 108 and 110 are adapted to visually present the electronic information of opposing pages respectively of a newspaper or a magazine for example, thereby simulating a two-page spread operation of an actual newspaper or magazine.

The cases 102 and 104 and the pivot 106 are arranged with operation blocks such as operation buttons for example. For example, a jog lever 112 is arranged on a lower portion of the pivot 106. The jog lever 112 may be switched on upward, downward, and in the push direction. On an upper portion of the pivot 106, a power button 114 for turning on/off the power is arranged. On the upper and lower portions of the jog lever 112, a backward button 116 and a forward button 118 are arranged respectively. The backward button 116 is used to return to the previous screen and the forward button 118 is used to advance to the next screen. Other operation buttons such as a reset button for example may be arranged on the pivot 106.

The cases 102 and 104 are each arranged with a page-turning button. On the left side of the jog lever 112, a page-turning left button 120 is arranged. On the right side of the jog lever 112, a page-turning right button 122 is arranged. The page-turning right button 122 is used to turn pages forward and the page-turning left button 120 is used to turn pages backward.

The case 102 is arranged with a left-hand zoom-in button 124 below the page-turning left button 120. The left-hand zoom-in button 124 is used to zoom in text for example displayed in a window of the left-hand display block 108 for example. The case 104 is arranged with a right-hand zoom-in button 126 below the above-mentioned page-turning right button 122. This right-hand zoom-in button 126 is used to zoom-in text for example displayed in a window of the right-hand display block 110. It should be noted that a speaker 128 for outputting sounds such as voice and music is arranged under the right-hand display block 110 of the case 102. For example, this speaker is used to audibly output the contents of a news item selected by a news-item button to be described later and output the music or tone associated with the selected news item.

On the left end of the case 102, an electronic information interface 130 is arranged. An electronic information recording medium 132 constituted by a semiconductor memory such as a memory card in which electronic information of newspapers or magazines for example is stored is detachably loaded on this electronic information interface 130. It should be noted that the electronic information interface 130 may also be configured such that electronic information interface 130 is connected to a network such as the Internet for example in a wired or wireless manner to receive the electronic information.

The electronic information at least includes the image information of a page space having a plurality of news items such as newspapers and magazines and the contents information associated with each news item or a partition in which each news item is positioned. The image information is image data obtained by imaging a whole page space of a newspaper or a magazine. On the basis of the image information, each entire page of a newspaper or a magazine is displayed on the left-hand display block 108 or the right-hand display block 110. Consequently, the layout of the partitions of news items is known. This page space layout of news items allows the reader to understand at a glance which news item is most important or is currently talked about. The above-mentioned news-item contents information is associated with a news-item partition in the image information of a page space, the position of a news item for example.

The contents information of each news item is configured by the text data of each news item and the image data such as a photograph of each news item. When a news item is selected, the news-item contents information is displayed on the left-hand display block 108 or the right-hand display block 110. If the news-item contents are displayed on the entire display block in vertically or horizontally written text display of legible character size, the contents of a news item which are too small in character size on the page space image to read are displayed in text display legible enough, thereby making the contents of the news item easy to read.

Figure 2:
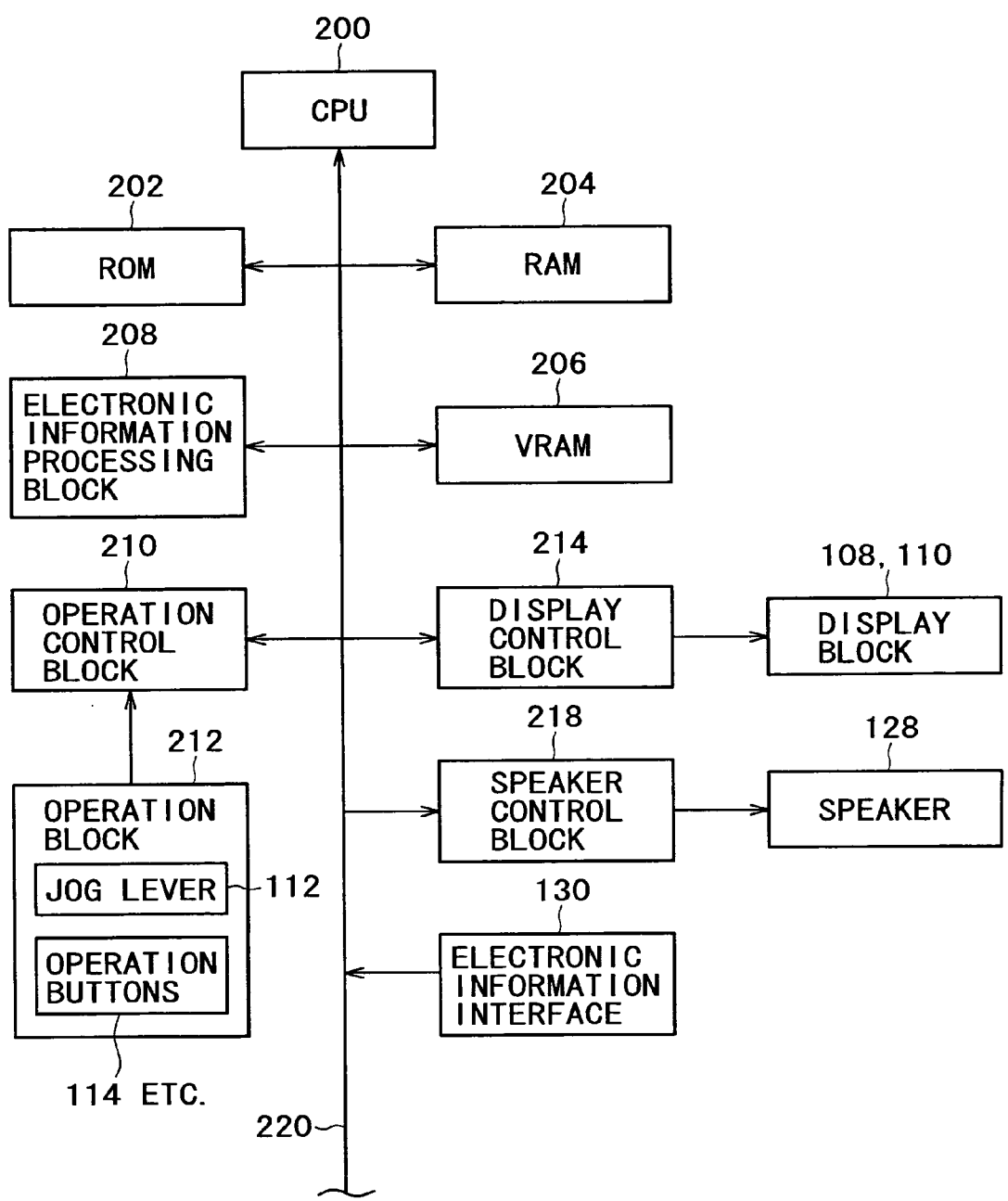
FIG. 2 is a block diagram illustrating an exemplary configuration of the above-mentioned embodiment.

Referring to FIG. 2, there is shown a circuit block diagram illustrating an entire configuration of the mobile information terminal apparatus 100. The mobile information terminal apparatus 100 includes a CPU (Central Processing Unit) 200 which forms a main body of a control unit, a ROM (Read Only Memory) 202 which is one example of a recording medium storing programs for controlling the component circuits, and a RAM (Random Access Memory) 204 having a memory area in which the CPU 200 develops a program from the ROM 202 as required and stores the developed program.

The mobile information terminal apparatus 100 also includes a VRAM (Video RAM) 206 for executing draw processing on the electronic information of news papers and magazines for example, an electronic information processing block 208 for executing predetermined processing on the electronic information of news papers and magazines for example, an operation control block 210 for controlling an operation block 212 having the above-mentioned jog lever 112 and various operation buttons (the power button 114, the page-turning left button 120, the page-turning right button 122, and so on), the above-mentioned display blocks 108 and 110, a speaker control block 218 for controlling the speaker 128, and the electronic information interface 130. The mobile information terminal apparatus 100 may also have a memory for temporarily storing the electronic information supplied from the electronic information interface 130. The ROM 202 may be constituted by a read/write memory to capture programs from the electronic information interface 130. In this case, programs may be captured from a semiconductor memory or from a Web page via a network such as the Internet.

The CPU 200 is electrically connected with the ROM 202, the RAM 204, the VRAM 206, the electronic information processing block 208, the operation control block 210, the display control block 214, the speaker control block 218, and the electronic information interface 130 via a bus line 220.

The CPU 200 reads a program from the ROM 202 as required and develops the program into the RAM 204, storing the developed program therein. The CPU 200 reads the developed program from the RAM 204 and executes it to control each component circuit of the mobile information terminal apparatus 100.

The CPU 200 reads the electronic information (or electronic data) of a newspaper or a magazine from the electronic information recording medium 132 via the electronic information interface 130, generates image data on the basis of the electronic data, and transfers the generated image data to the VRAM 206 for draw processing. The CPU 200 reads the image data written to the VRAM 206 and transfers the image data to the display blocks 108 and 110 via the display control block 214, thereby displaying the image data.

<Electronic Information Display Control>

The following describes an electronic information display control operation to be executed by the mobile information terminal apparatus 100 associated with the invention with reference to drawings. In the following description, the data of a newspaper are used as one example of the electronic information. In order to display the electronic information of a newspaper, the front page (or page 1) of the newspaper is first displayed on the right-hand display block 110 by electronic information display control. The electronic information display control in accordance with an operation done through the operation block 212 includes page turning control, news-item button display control, window control, news-item button select control, and news-item contents zoom-in control, for example.

Figure 3:
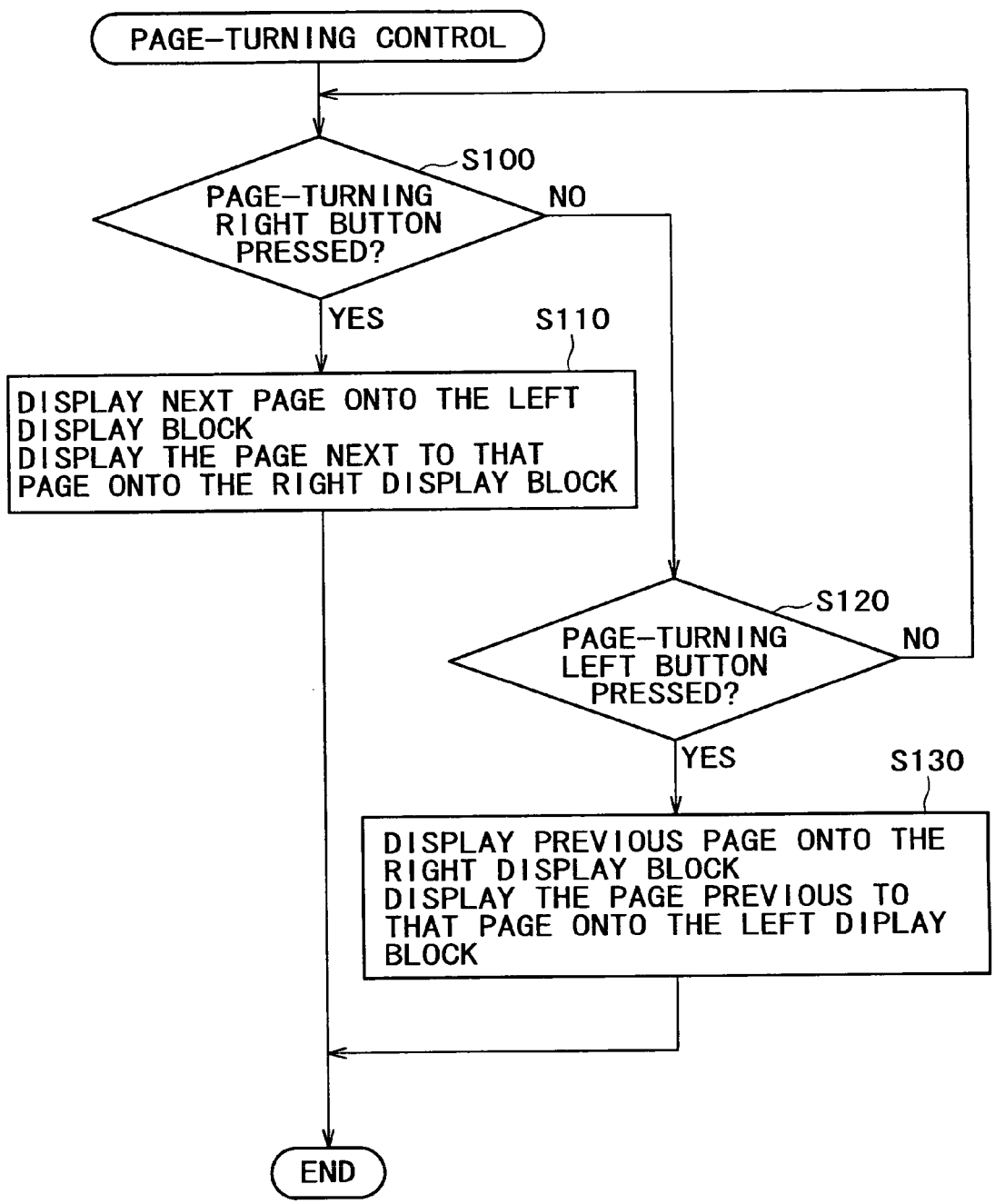
FIG. 3 is a flowchart indicative of page-turning control in the above-mentioned embodiment.

First, a flowchart indicative of page turning control as one example of an image information display control means and an image information display control step is shown in FIG. 3. Page turning control turns the pages of a newspaper displayed on the display blocks 108 and 110. To be more specific, a decision is made in step S100 whether the page-turning right button 122 has been pressed. If the page-turning right button 122 is found pressed, then, in step S110, a next page of the newspaper is displayed on the left-hand display block 108 and the page next to the page now displayed on the left-hand display block 108 is displayed on the right-hand display block 110.

If the page-turning right button 122 is found not pressed in step S100, then a decision is made in step S120 whether or not the page-turning left button 120 has been pressed. If the page-turning left button 120 is found not pressed, the procedure returns to step S100. If the page-turning left button 120 is found pressed, then, in step S130, the previous page is displayed on the fight-hand display block 110 and the page previous to the page now displayed on the right-hand display block 110 is displayed on the left-hand display block 108.

It should be noted that the above-mentioned page turning control is executed when displaying the electronic information of a left-side bound (horizontally written) newspaper or magazine; in the case of a right-side bound (vertically written) newspaper or magazine, the previous page is displayed on the left-hand display block 108 and the page previous to the page now displayed on the left-hand display block 108 is displayed on the right-hand display block 110 in step S110 and the next page is displayed on the right-hand display block 110 and the page next to the page now displayed on the right-hand display block 110 is displayed on the left-hand display block 108.

Figure 4:
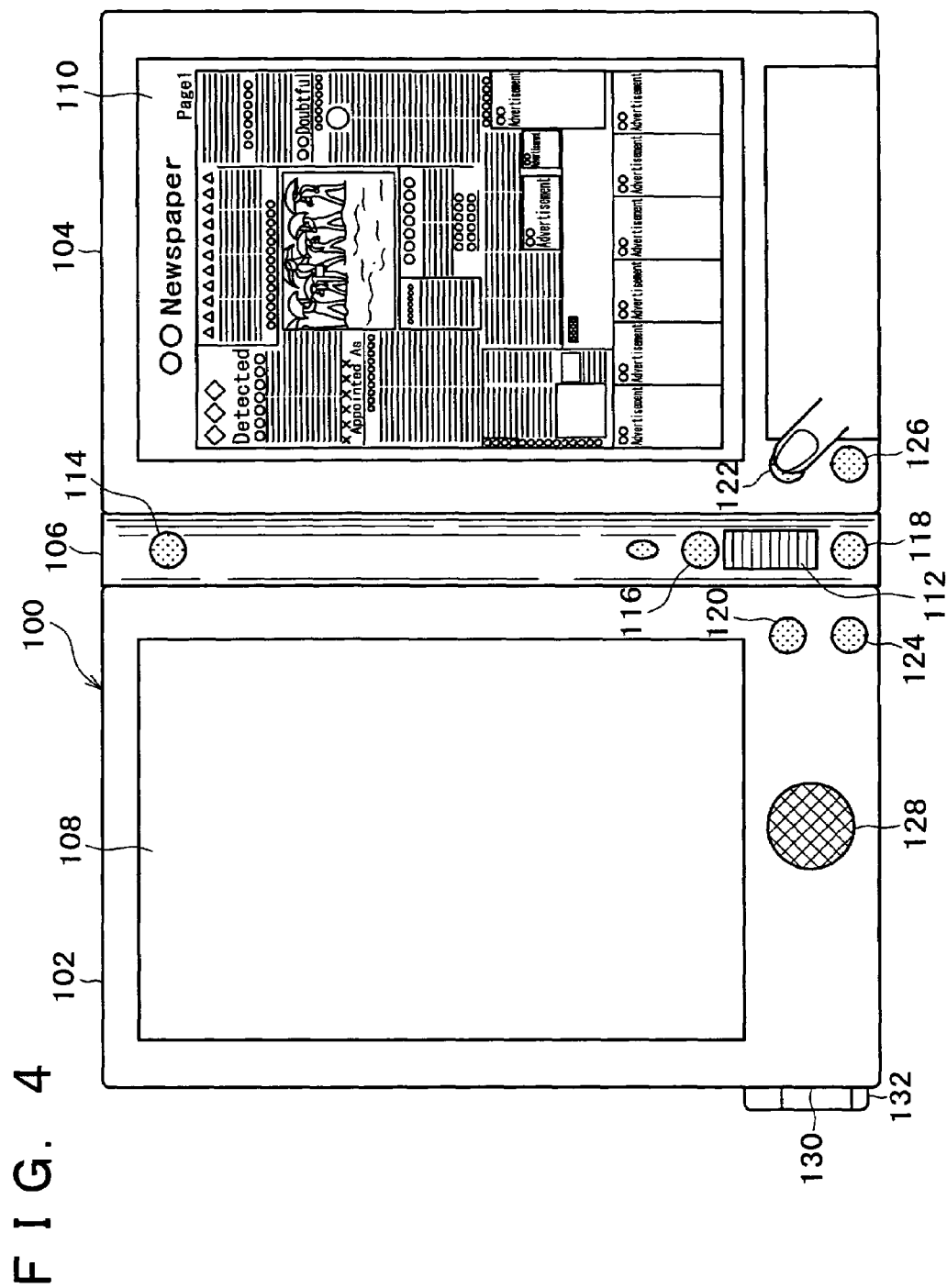
FIG. 4 is a diagram illustrating an exemplary screen display on a display block by the page-turning control in the above-mentioned embodiment.
Figure 5:
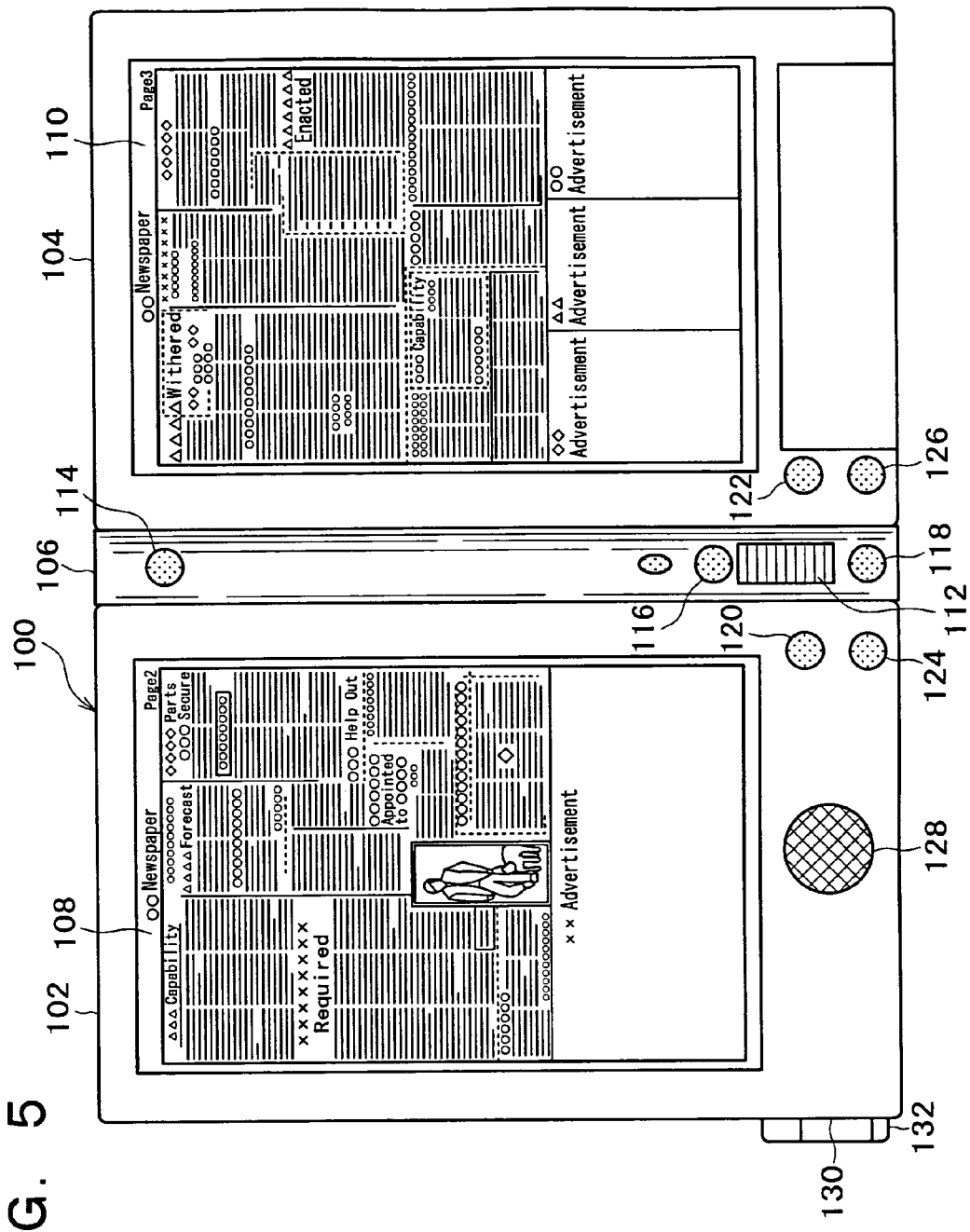
FIG. 5 is a diagram illustrating another exemplary screen display on the display block by the page-turning control in the above-mentioned embodiment.

According to this page turning control, pressing the page-turning right button 122 when the page space image of page 1 of a newspaper is displayed on the right-hand display block 110 as shown in FIG. 4 displays the page space image of page 2 of this newspaper on the left-hand display block 110 and the page space image of page 3 of this newspaper on the right-hand display block 110 as shown in FIG. 5. Consequently, by displaying the page space images of a newspaper as they are, the text and photographs in a news-item partition are displayed as they are. The page space layout including the text and photographs of a newspaper allows the reader to understand at a glance which news item is important (news-item weighting) or currently talked about.

Figure 6:
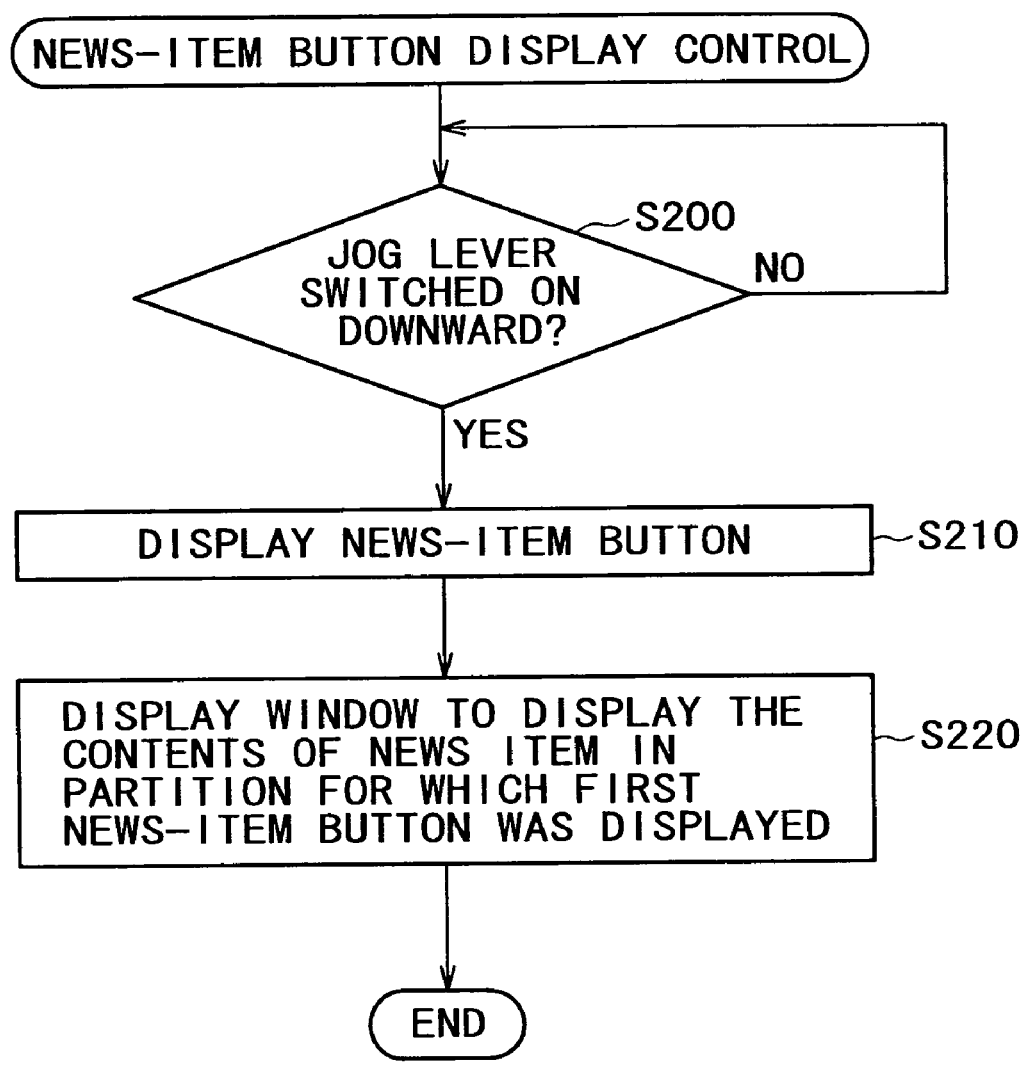
FIG. 6 is a flowchart indicative of news-item button display control in the above-mentioned embodiment.

A flowchart indicative of news-item button display control as one example of a news-item button display control means and a news-item button display control step is shown in FIG. 6. News-item button display control displays a news-item button as one example of a news-item marker for selecting a news item within a news-item partition in the newspaper page space images displayed on the display blocks 108 and 110.

To be more specific, a decision is made in step S200 whether or not the jog lever 112 has been switched on downward. If the jog lever 112 is found switched on downward, then a news-item button 140 is displayed in step S210. The news-item button 140 is displayed in each news-item partition in the newspaper page space images displayed on the display blocks 108 and 110. For example, the news-item button 140 is displayed in the proximity of a news-item header. By arranging the news-item button 140 in the proximity of a news-item header, the reader knows at a glance that this is the news-item button for the news-item partition having that header.

Next, in step S220, a window is displayed on one of the display blocks 108 and 110 and the news-item contents information in the partition in which the news-item button 140 is displayed is displayed in that window. The first news-item button 140 is a news-item button located at the upper left corner of the lower-number page in the case of the electronic information of a newspaper for example. Thus, selecting the news-item marker by means of the jog lever 112 further facilitates the selection of news-items and the display of the contents of the selected news item.

Figure 7:
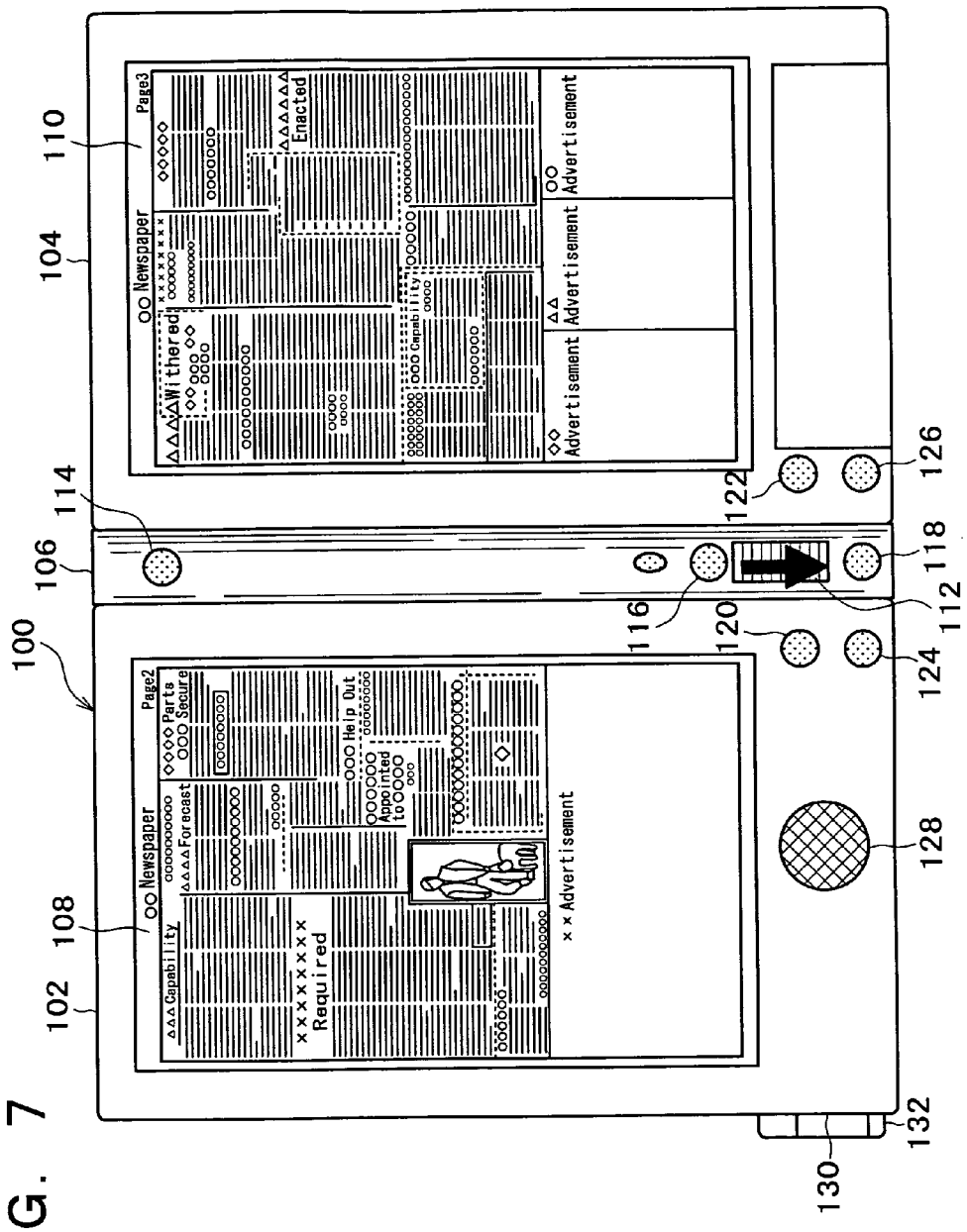
FIG. 7 is a diagram illustrating an exemplary screen display on the display block by news-item button display control in the above-mentioned embodiment.
Figure 8:
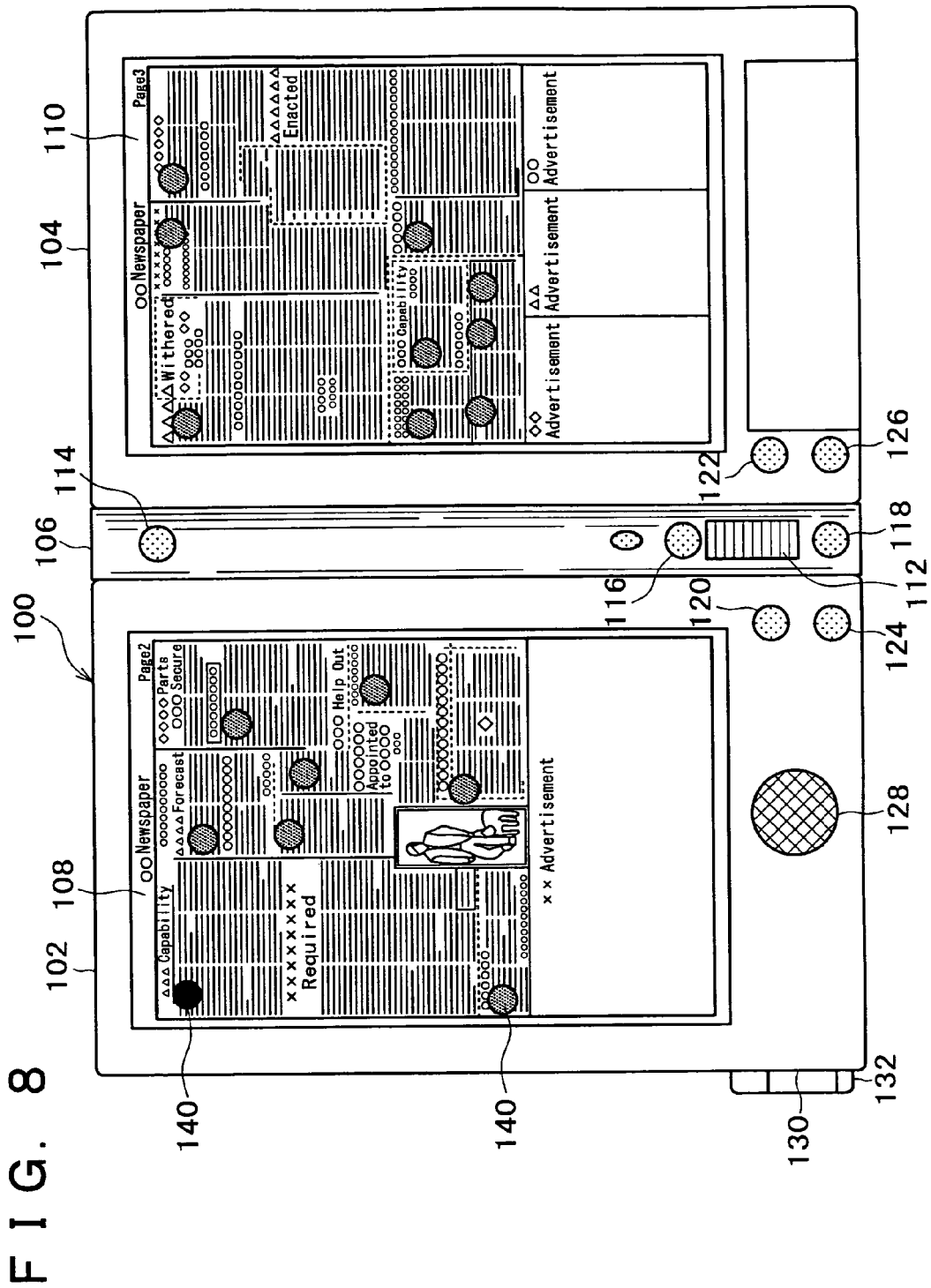
FIG. 8 is a diagram illustrating another exemplary screen display on the display block by news-item button display control in the above-mentioned embodiment.

According to this news-item button display control, when the jog lever 112 is switched on downward with the page space image of page 2 of the newspaper displayed on the left-hand display block 108 and the page space image of page 3 of the newspaper displayed on the right-hand display block 110 as shown in FIG. 7, the news-item button 140 is displayed in each news-item partition of the paper space images of the newspaper as shown in FIG. 8.

Figure 9:
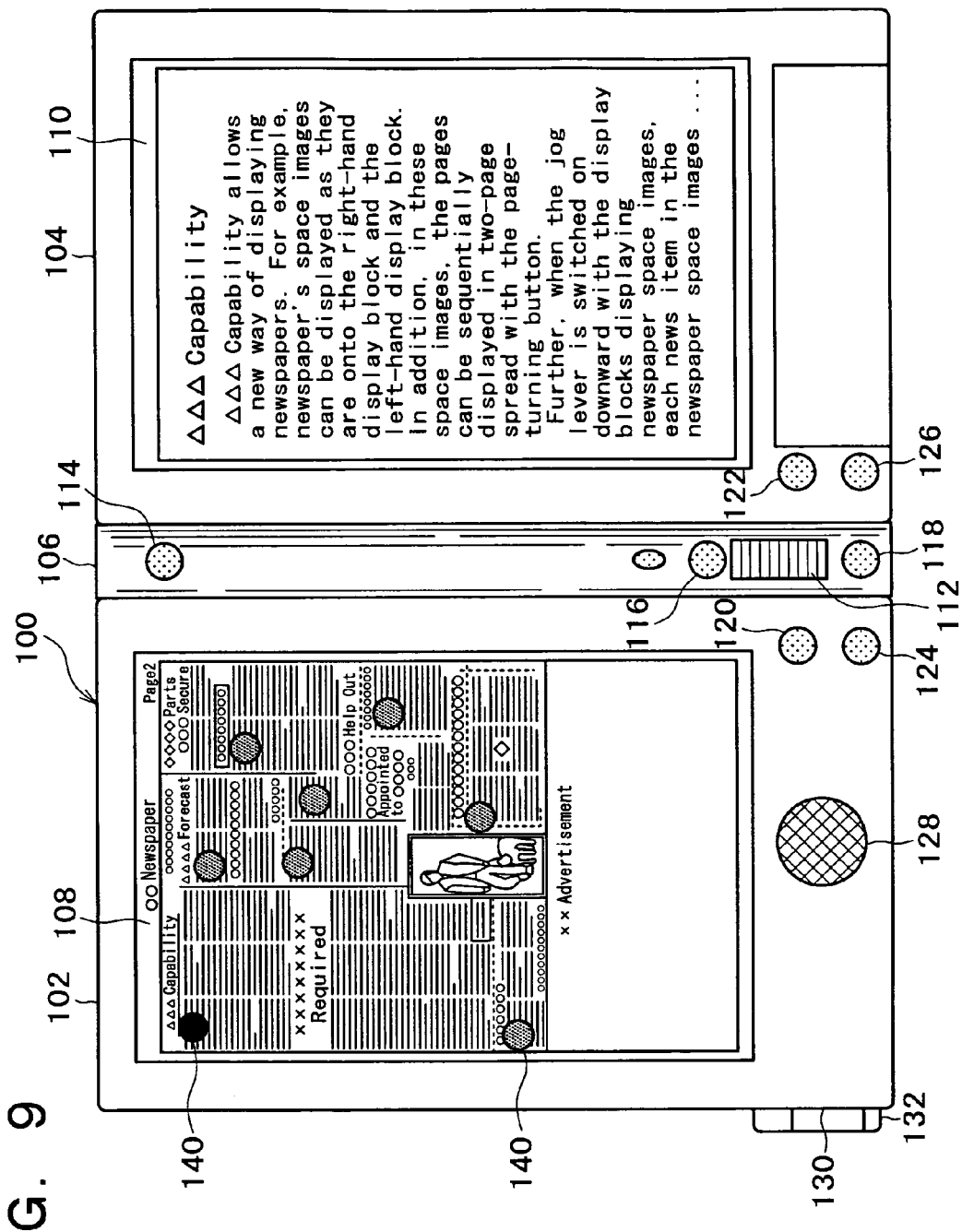
FIG. 9 is a diagram illustrating still another exemplary screen display on the display block by news-item button display control in the above-mentioned embodiment.

Next, as shown in FIG. 9, the window is displayed all over the page space image on the right-hand display block 110 and the news-item contents information of the partition indicated by the news-item button 140 is displayed in the window. In displaying news-item contents information, it may be displayed in vertically or horizontally written text having a legible character size all over the display block for example. This allows news-item contents which are too small in character size to be easy read on the page space image of each page of a newspaper to be displayed in a character size large enough for easy reading. And, not only the frame of each news item but also an actual paper space image containing text and photographs are displayed, thereby allowing the reader to easily understand the weighting of each news item.

The news-item contents to be displayed in the window may include not only letters in text but also a photograph in an enlarged size, in case that a photograph exists therein. In addition, the sound information such as voice and music associated with the news-item contents displayed in the window may be outputted from the speaker 128.

The above-mentioned window is displayed on the display block other than the display block on which the first news-item button 140 is displayed. The news-item button 140 associated with the news-item contents displayed on the other display block is shown in a different manner from those news-item buttons 140 located to the other news items. For example, the news-item button 140 associated with currently displayed news item may be shown darker than the other news-item buttons 140 or in a different color than the color of the other news-item button 140 if the display blocks are color supported. This setup allows the reader to view both the paper space image of a newspaper and the news-item contents in each partition in the page at the same time, so that the reader may check which partition's news-time of a newspaper displayed in a paper space image is being displayed while reading the displayed news-item content.

Figure 10:
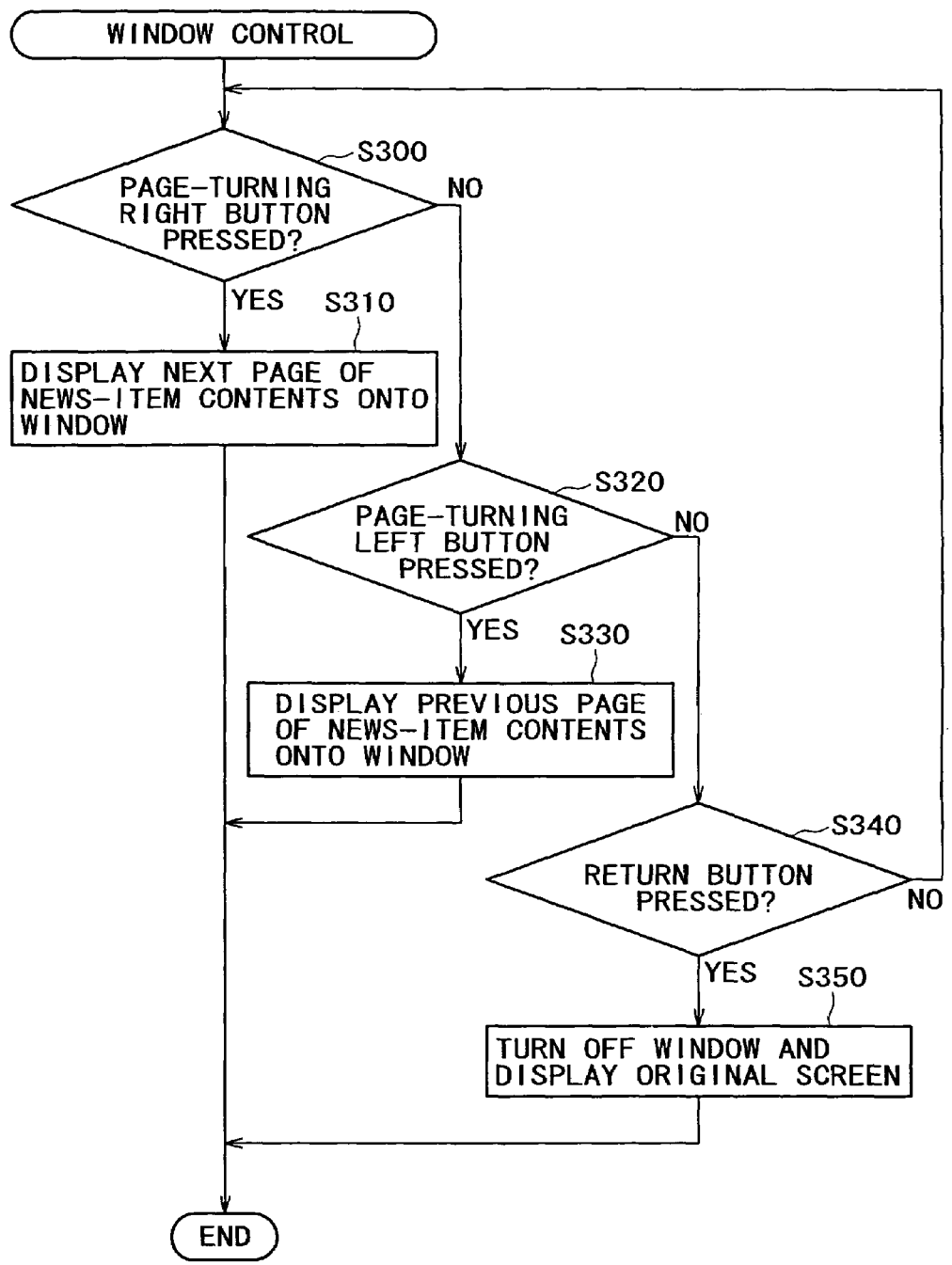
FIG. 10 is a flowchart indicative of window control in the above-mentioned embodiment.

FIG. 10 shows a flowchart indicative of window control. Window control switches between the pages of news-item contents information displayed in the windows on the display blocks 108 and 110 and displays the original newspaper page space image by erasing the window. In the window, news-item contents information is displayed in text for example, all the contents information may not be displayed at once depending on the contents of news item. Therefore, the number of characters or an image size which can be displayed in the window at once provides one page. Pages thus obtained are switched between. It should be noted that, instead of switching between pages, the contents displayed in the window may be scrolled.

To be more specific, a decision is made in step S300 whether the page-turning right button 122 has been pressed. If the page-turning right button 122 is found pressed, the next page of news-item contents information is displayed in the window in step S310.

If the page-turning right button 122 is found not pressed in step S300, then a decision is made in step S320 whether or not the page-turning left button 120 has been pressed. If the page-turning left button 120 is found pressed, the previous page of news-item contents information is displayed in the window in step S330.

If the page-turning left button 120 is fount not pressed in step S320, then a decision is made in step S340 whether the backward button 116 is pressed. If the backward button 116 is found not pressed, then the procedure returns to step S300. If the backward button 116 is found pressed, the window is erased in step S350, displaying the original screen (a page space image of newspaper for example) which had been displayed when this window was displayed.

Figure 11:
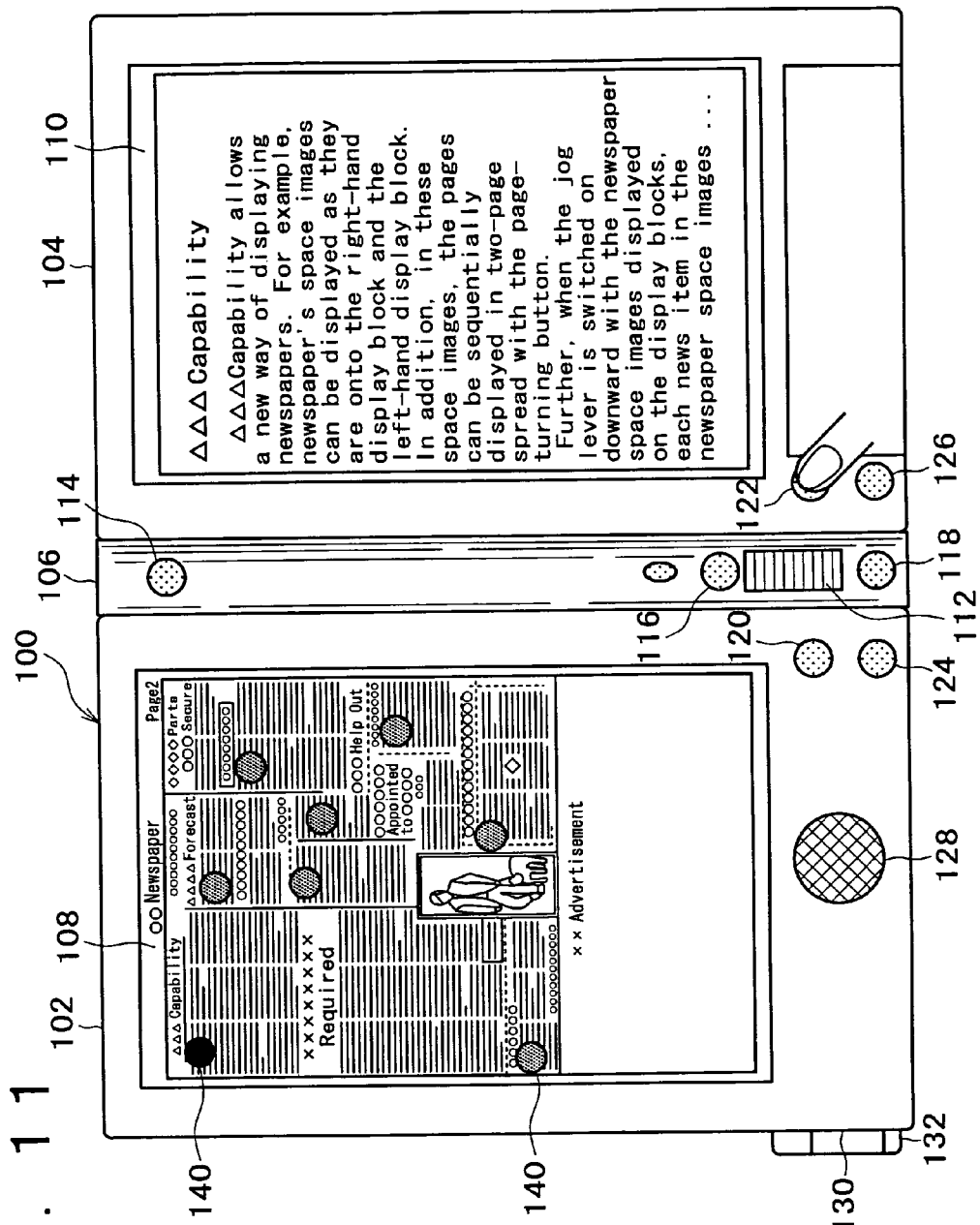
FIG. 11 is a diagram illustrating an exemplary screen display on the display block by window control in the above-mentioned embodiment.
Figure 12:
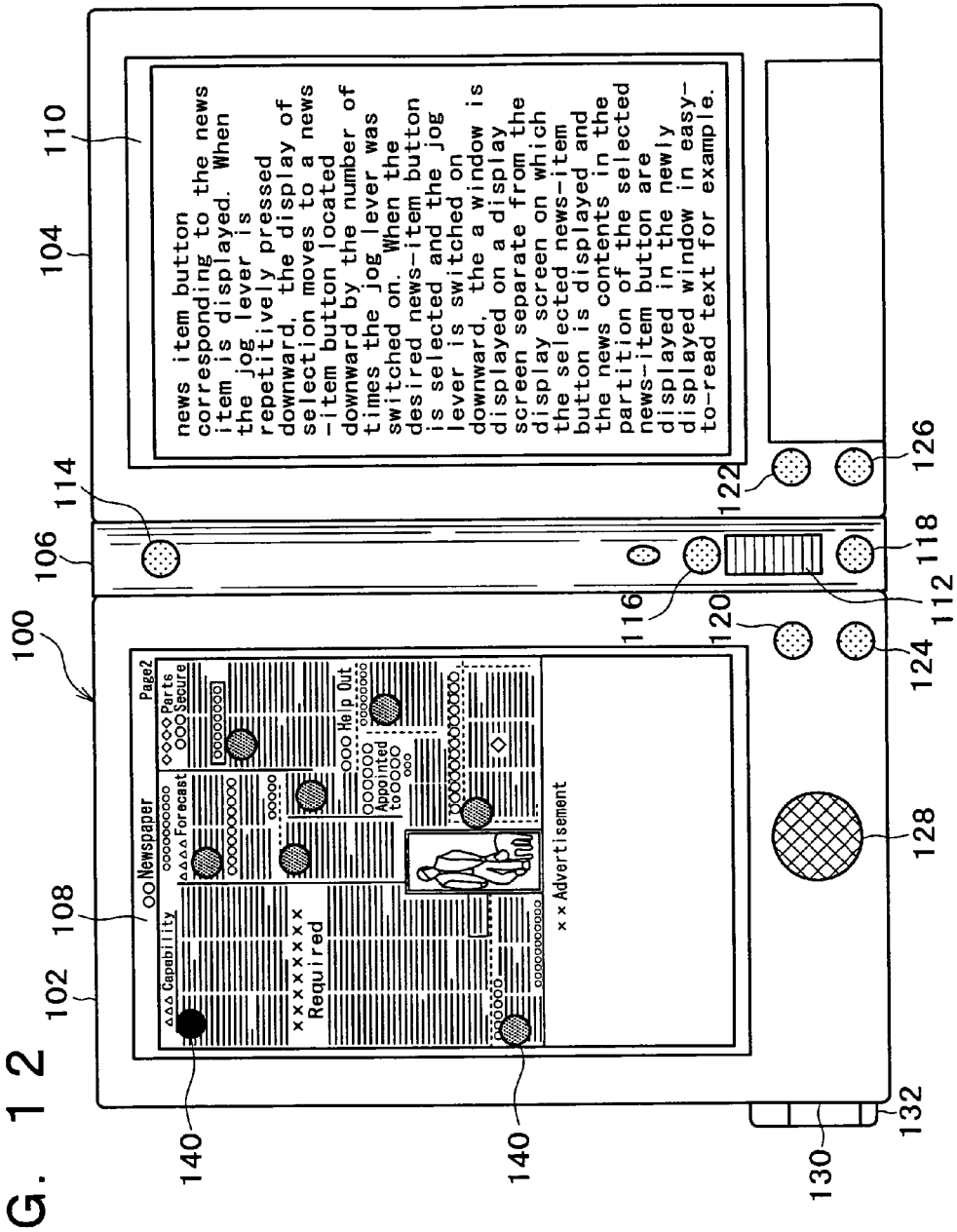
FIG. 12 is a diagram illustrating another exemplary screen display on the display block by window control in the above-mentioned embodiment.

According to this window control, when the page-turning right button 122 is pressed with news-item contents displayed in the window as shown in FIG. 11, the page continued from the news-item contents displayed in the window is displayed in the window as shown in FIG. 12. This setup allows the reader to continue reading the news-item contents in a character size large enough for easy reading.

Figure 13:
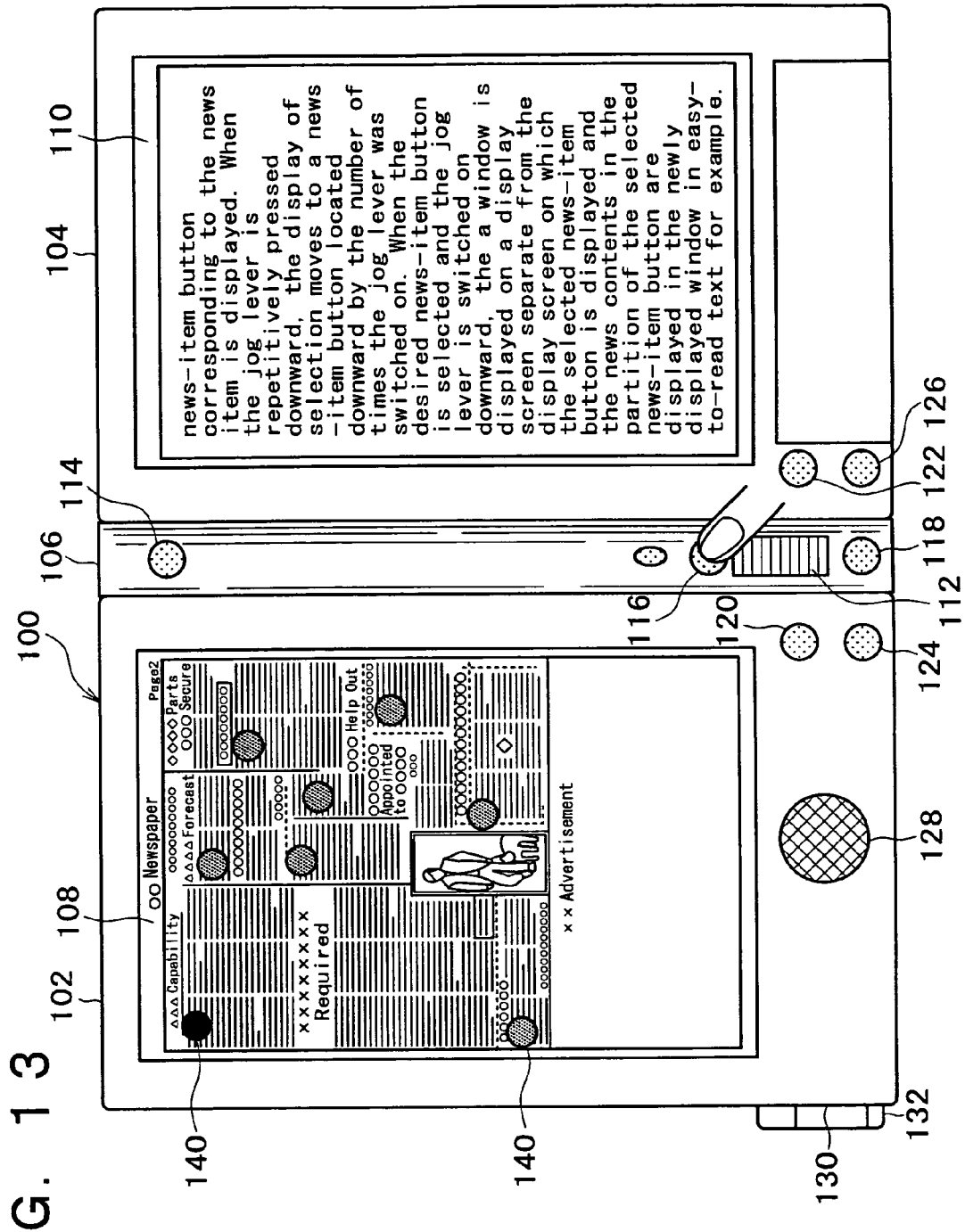
FIG. 13 is a diagram illustrating still another exemplary screen display on the display block by window control in the above-mentioned embodiment.
Figure 14:
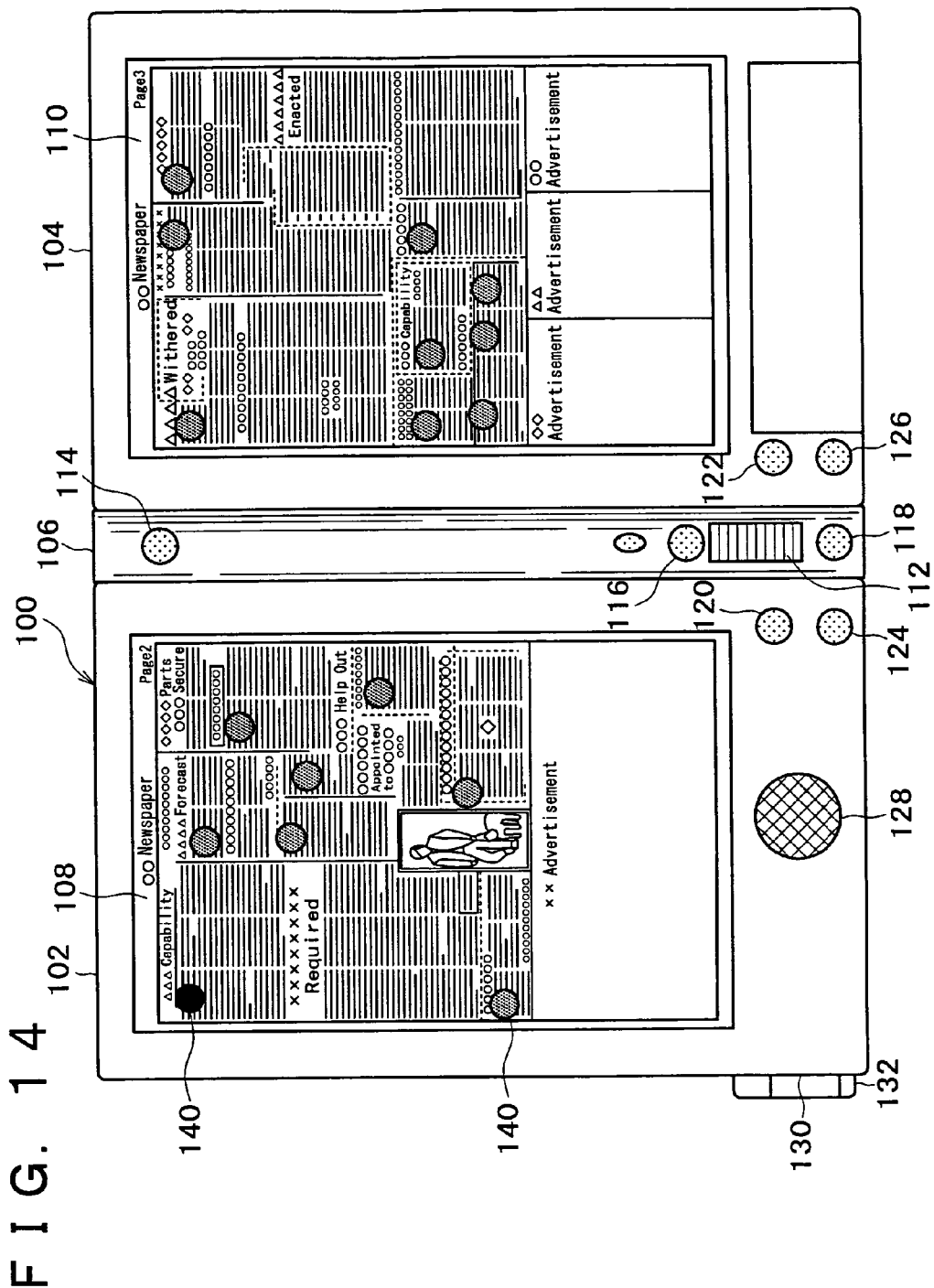
FIG. 14 is a diagram illustrating yet another exemplary screen display on the display block by window control in the above-mentioned embodiment.

When the backward button 116 is pressed with the window displayed as shown in FIG. 13, the window disappears as shown in FIG. 14 and the page space image of the newspaper which is the original screen displayed before the window was displayed is displayed. The setup allow the reader to select a desired news item from the page space image of the original screen.

It should be noted that, if the page-turning left button 120 is pressed again when the last page of the news-item contents of the selected news-item button 140 is displayed, the news-item contents of the next news-item button may be displayed in the window. The sequence of news-item buttons in this case may be a sequence in which the news-item buttons in news-item button select control to be described later are displayed as select candidates.

Figure 15:
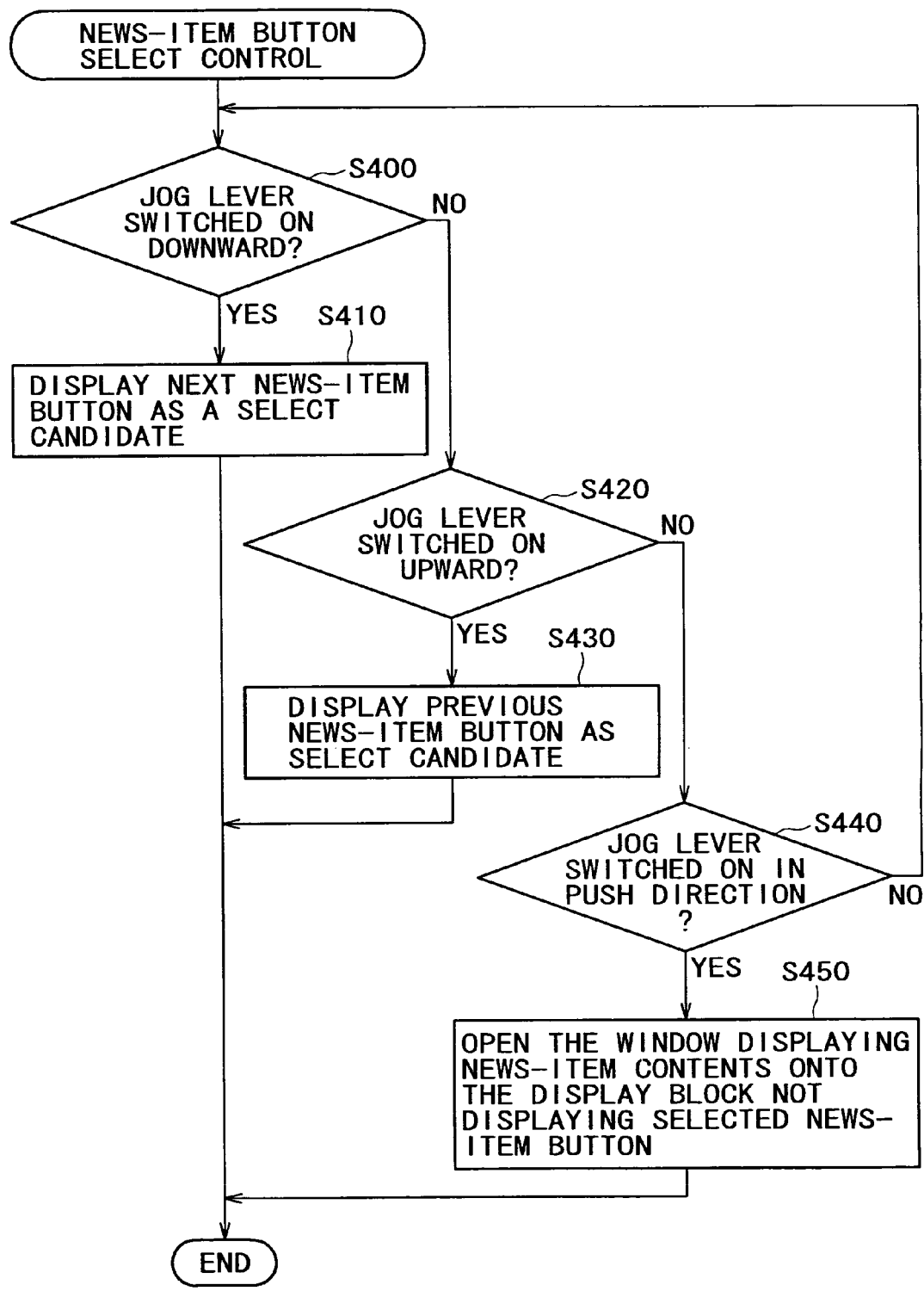
FIG. 15 is a flowchart indicative of new-item button select control in the above-mentioned embodiment.

FIG. 15 shows a flowchart indicative of news-item button select control as one example of a news-item contents information display control means and a news-item contents information display control step. News-item button select control selects the news-item button 140 shown on the page space images on the display sections 108 and 110 to display the news-item contents information indicated by the selected news-item button 140. To be more specific, first, a decision is made in step S400 whether the jog lever 112 has been switched on downward.

If the jog lever 112 is found switched on downward in step S400, then a next news-item button 140 is displayed as a selection candidate in step S410. The selection candidate herein denotes that the selected news-item button 140 is shown in a different manner than the other news-item buttons 140. For example, the selected news-item button 140 is shown darker than the other news-item buttons 140 or shown in reverse video. If the display blocks are color-supported, the selected news-item button 140 may be shown in a different color than the other news-item buttons 140.

It should be noted that the sequence of the news-item buttons 140 to be displayed as selection candidates may be arranged such that, if it is assumed that the topmost news-item button is the first button, then the selection sequentially shifts down the lower news-item buttons 140; if it is assumed that the rightmost news-item button 140 is the first button, then the selection sequentially shifts to the left-hand news-item buttons 140; or if it is assumed that the leftmost news-item button 140 is the first, then the selection sequentially shifts to the right-hand news-item buttons 140. Alternatively, a point in certain display block may be set as an origin, from which news-item buttons 140 are sequentially selected in the order of shorter distances from the origin. Still alternatively, the sequence of selections may be set beforehand. In this case, the setting of the sequence for selectively displaying news-item buttons 140 as candidates may be changed as desired.

If the jog lever 112 is found not switched on downward in step S400, then a decision is made in step S420 whether or not the jog lever 112 is switched on upward. If the jog lever 112 is found switched on upward, the previous news-item button 140 is displayed as selection candidate in step S430.

If the jog lever 112 is found not switched on upward in step S420, then a decision is made in step S430 whether or not the jog lever 112 has been switched on in the push direction. If the jog lever 112 is found switched on in the push direction, then the procedure returns to step S400.

If the jog lever 112 is found switched on in the push direction in step S440, then the window in which the news-item contents information is displayed is opened, in step S450, on the display block on which the news-item button 140 is not displayed.

Figure 16:
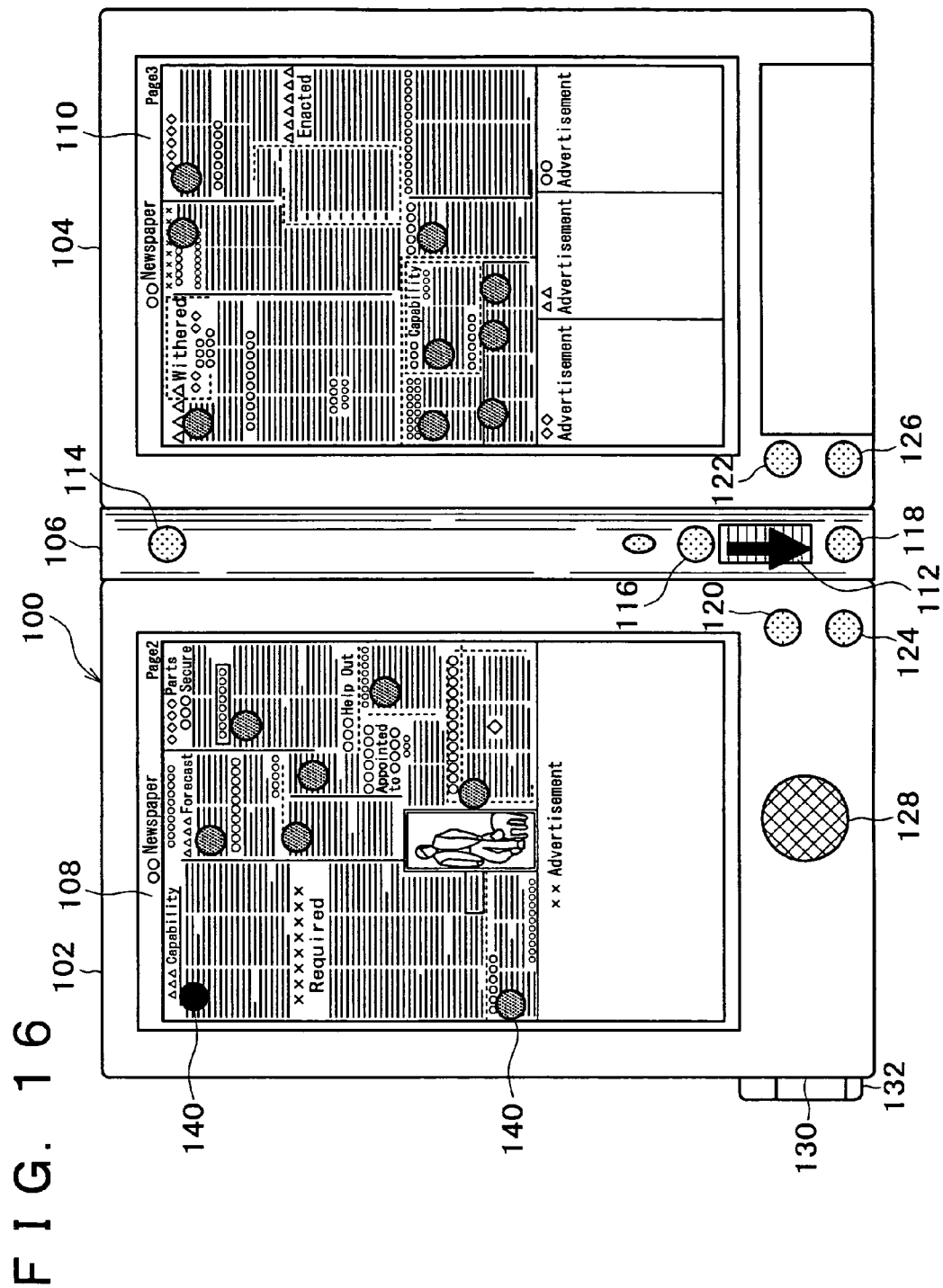
FIG. 16 is a diagram illustrating an exemplary display screen on the display block by news-item button select control in the above-mentioned embodiment.
Figure 17:
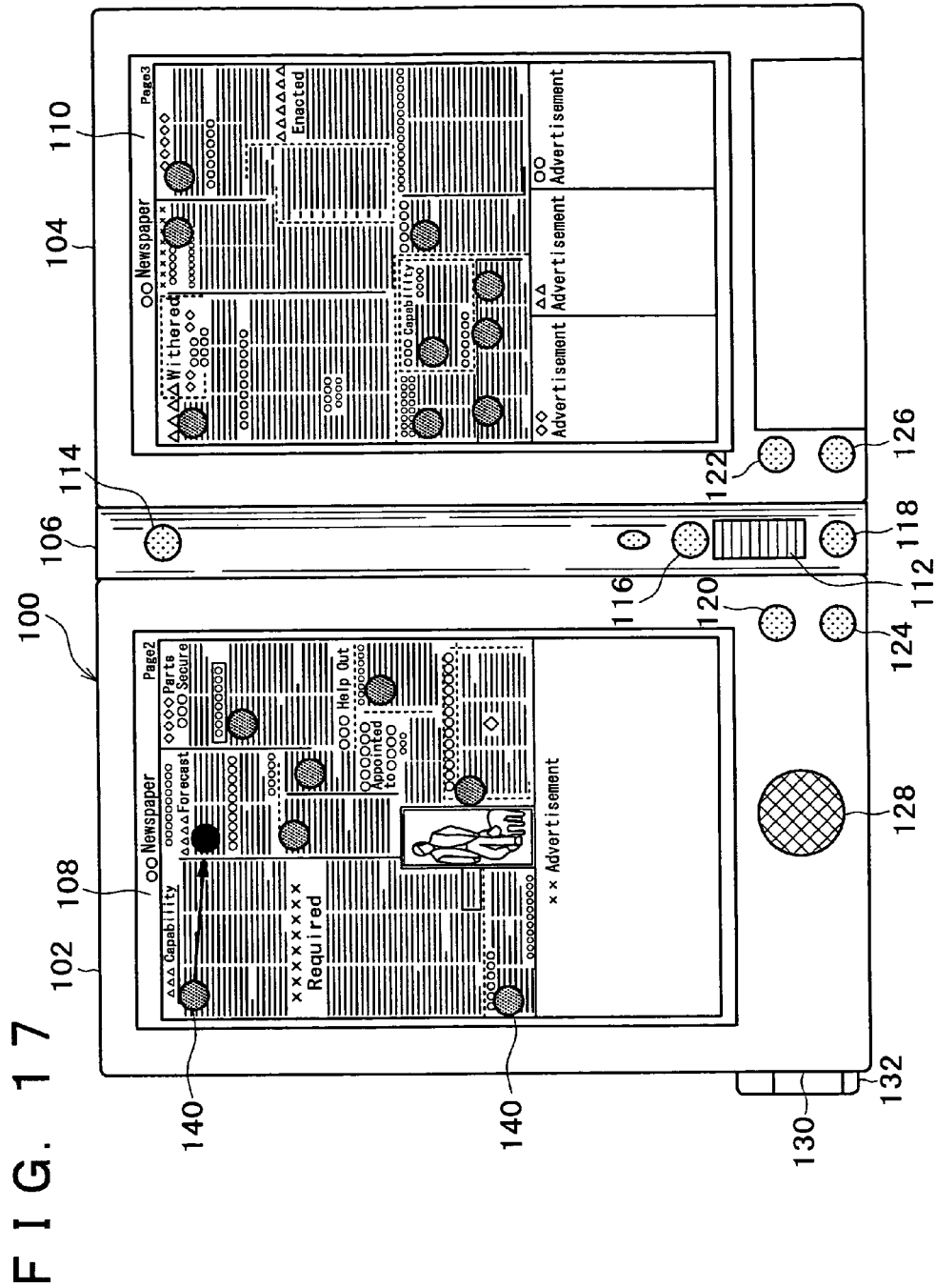
FIG. 17 is a diagram illustrating another exemplary display screen on the display block by news-item button select control in the above-mentioned embodiment.

According to this news-item button select control, if page space images are displayed on both the left-hand display block 108 and the right-hand display block 110 in a two-page spread manner as shown in FIG. 16, the news-item button 140 located at the topmost of the left-hand display block 108 is displayed as the first selection candidate. When the jog lever 112 is switched on downward in this state, the news-item button which is below and nearest to the news-item button displayed as the first selection candidate is displayed as selection candidate as shown in FIG. 17.

Figure 18:
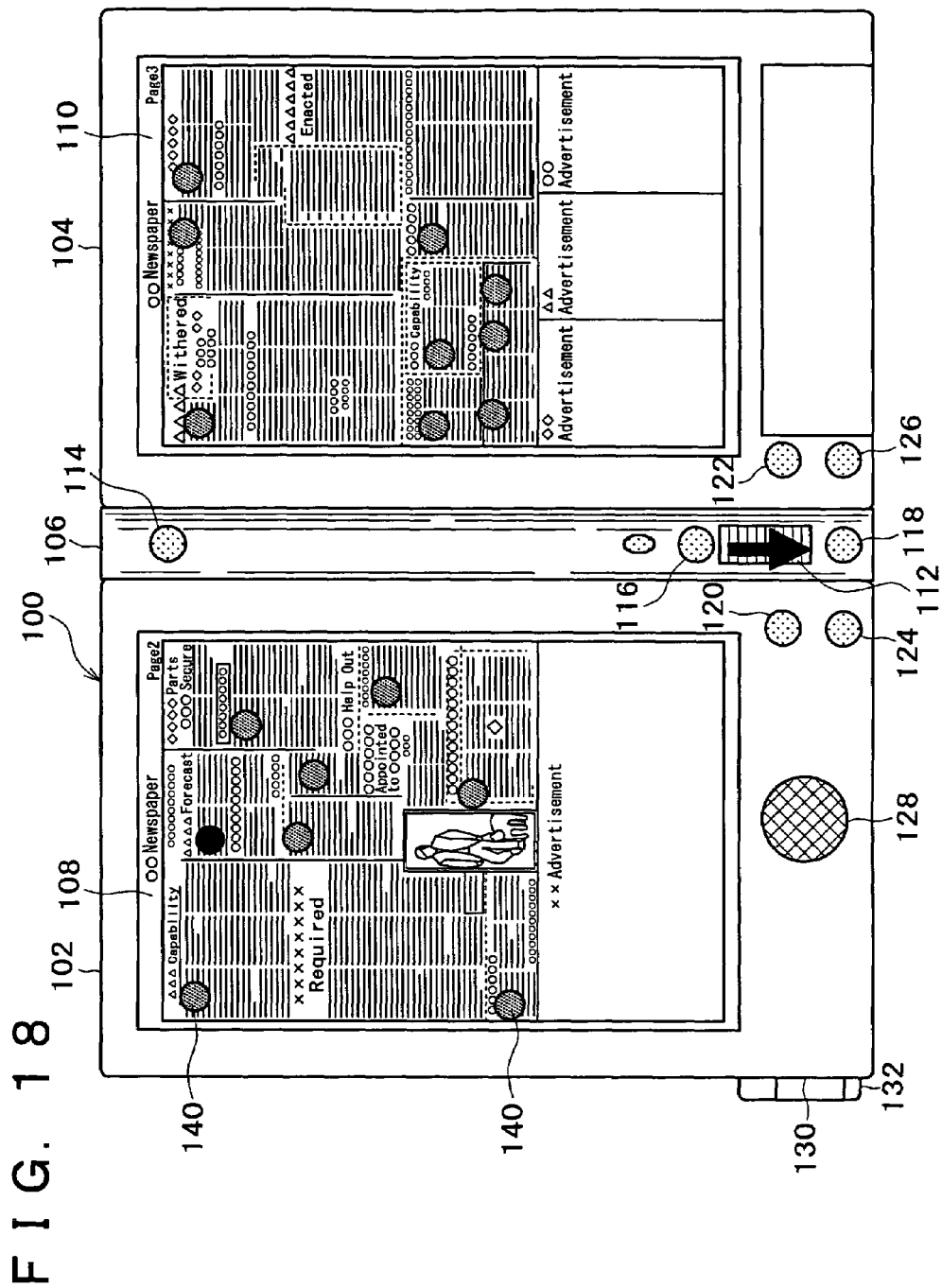
FIG. 18 is a diagram illustrating still another exemplary display screen on the display block by news-item button select control in the above-mentioned embodiment.

When the jog lever 112 is switched on downward repetitively in this state as shown in FIG. 18, candidate selection display shifts to news-item buttons downward.

Figure 19:
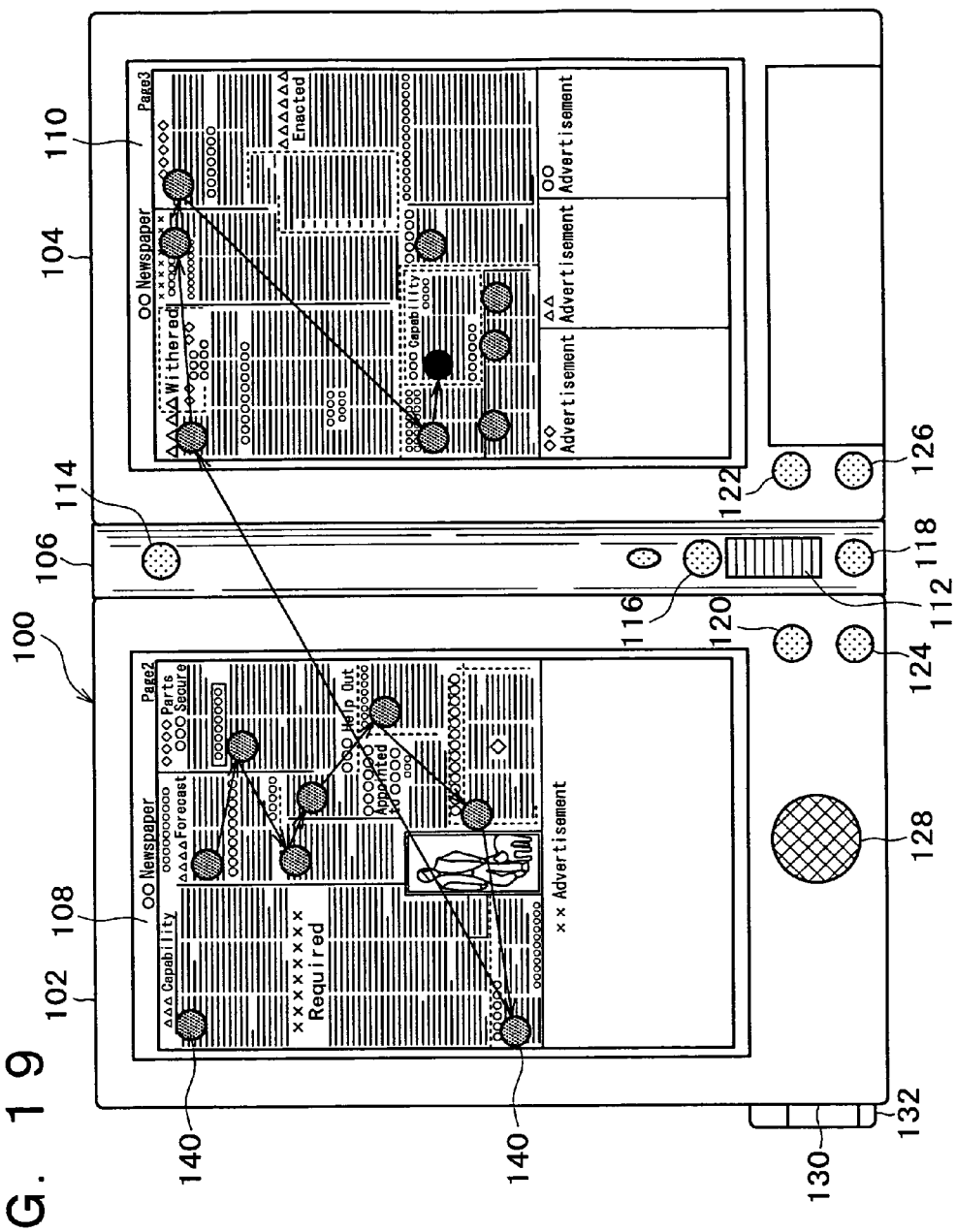
FIG. 19 is a diagram illustrating yet another exemplary display screen on the display block by news-item button select control in the above-mentioned embodiment.

The sequence in which candidate selection display shifts is that, if the news-item button 140 in the upper left corner of the left-hand display block 108 shown in FIG. 19 is the first news-item button, candidate selection display shifts to the lower news-item buttons 140 in the order indicated by arrows as shown in FIG. 19. Then, when candidate selection display has reached the news-item button 140 which is the last button in the left-hand display block 108, then candidate selection display shifts to the news-item button 140 in the upper right corner of the right-hand display block 110. Then, candidate selection display shifts down to the lower news-item buttons 140 on the right-hand display block 110.

Figure 20:
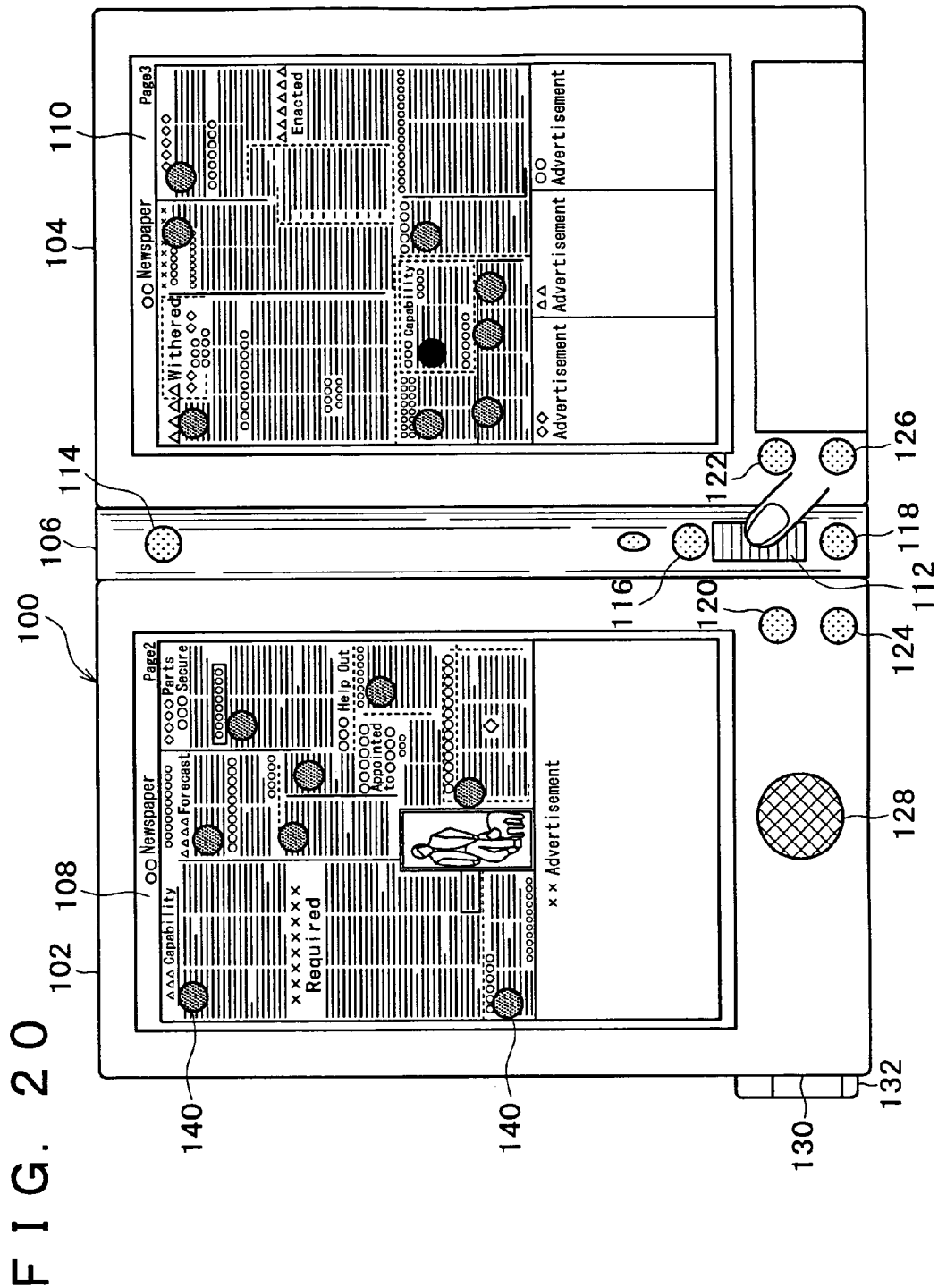
FIG. 20 is a diagram illustrating a different exemplary display screen on the display block by news-item button select control in the above-mentioned embodiment.
Figure 21:
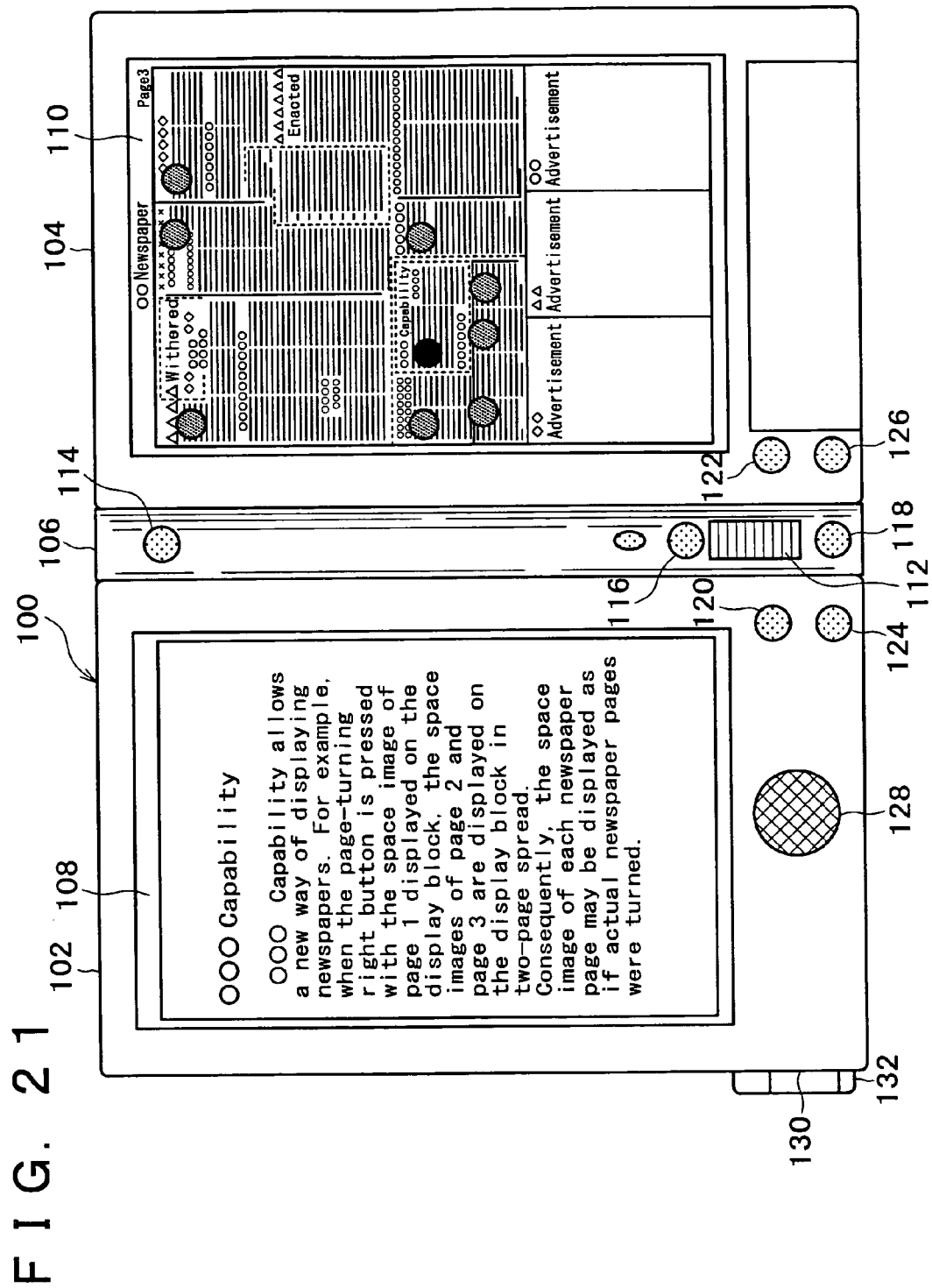
FIG. 21 is a diagram illustrating a still different exemplary display screen on the display block by news-item button select control in the above-mentioned embodiment.

When the jog lever 112 is switched on in the push direction in the state that the news-item button 140 is displayed for candidate selection as shown in FIG. 20, the window is opened as shown in FIG. 21, in which the news-item contents in the partition indicated by the news-item button 140 are displayed in text having a legible size. In this example, because the news-item buttons 140 in the right-hand display block 110 are displayed for candidate selection, the window in which the news-item contents information indicated by the selected news-item button 140 in the right-hand display block 110 is displayed is opened all over the left-hand display block 108.

As described, any desired news-item buttons displayed on page space images may be selected with ease by operating the jog lever 112 to display the selected news-item contents in the window in an easy to read manner. Besides, because news items may be selected while looking at page space images, news items may be selected by checking their weightings which are easily known from the page layout shown on the display block. This setup provides a new mode of viewing newspapers and magazines which allows each reader to easily read news items while being aware of page space images even with mobile information terminal apparatuses such as PDAs (Personal Digital Assistants) and mobile phones which are limited in the size of their display screens. This setup also helps reduce the size of the display screens of display apparatuses for displaying electronic information such as electronic newspapers.

Figure 22:
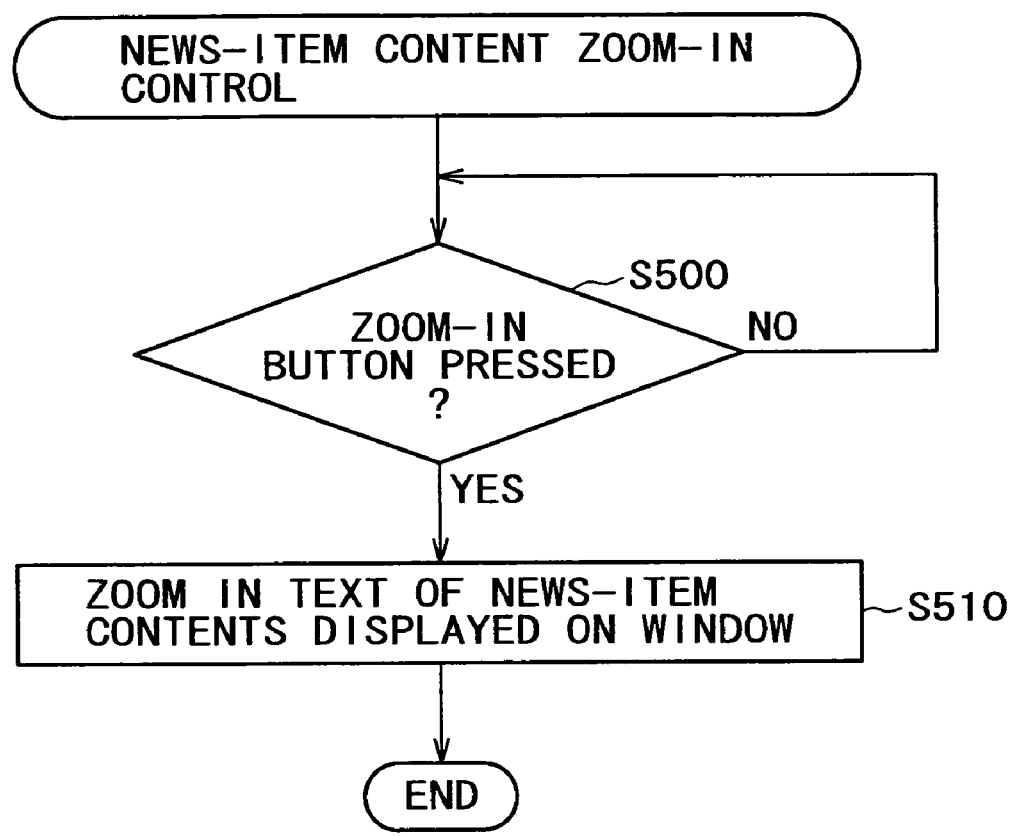
FIG. 22 is a flowchart indicative of news-item contents zoom-in control in the above-mentioned embodiment.

FIG. 22 shows a flowchart indicative of news-item contents zoom-in control. News-item contents zoom-in control further zooms in the text of news-item contents information displayed in the window. To be more specific, a decision is made in step S500 whether a zoom-in button has been pressed. If the zoom-in button is found pressed, then the text of the news-item contents displayed in the window is magnified in step S510.

At this time, zoom-in display may be executed when the zoom-in display button arranged on which the window is displayed. For example, when the window is displayed on the left-hand display block 108, pressing the left-hand zoom-in button 124 displays the contents in that window in a zoom-in manner and, when the window is displayed on the right-hand display block 110, pressing the right-hand zoom-in button 126 displays the contents of that window in a zoom-in manner.

Figure 23:
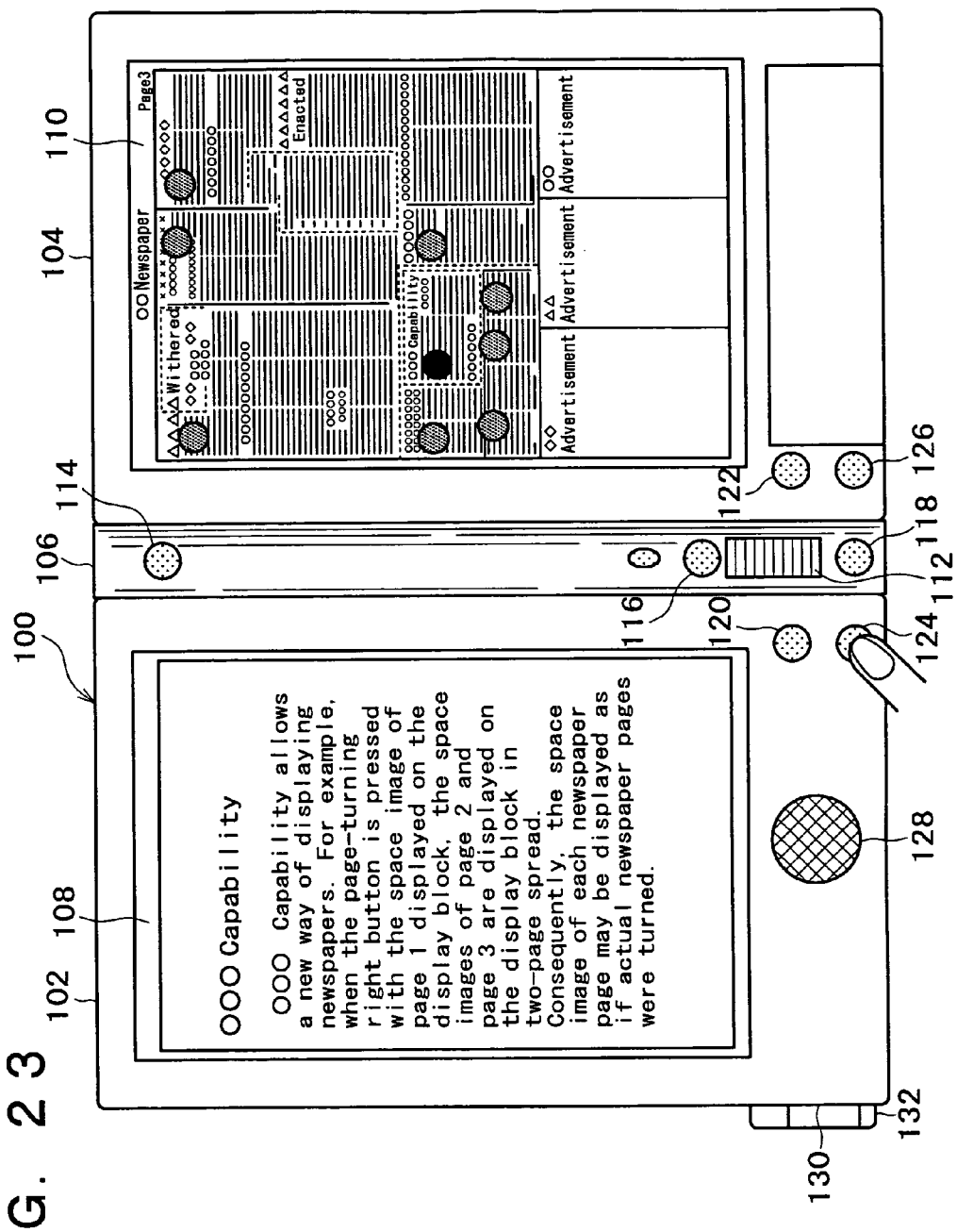
FIG. 23 is a diagram illustrating an exemplary screen display on the display block by news-item contents zoom-in control in the above-mentioned embodiment.
Figure 24:
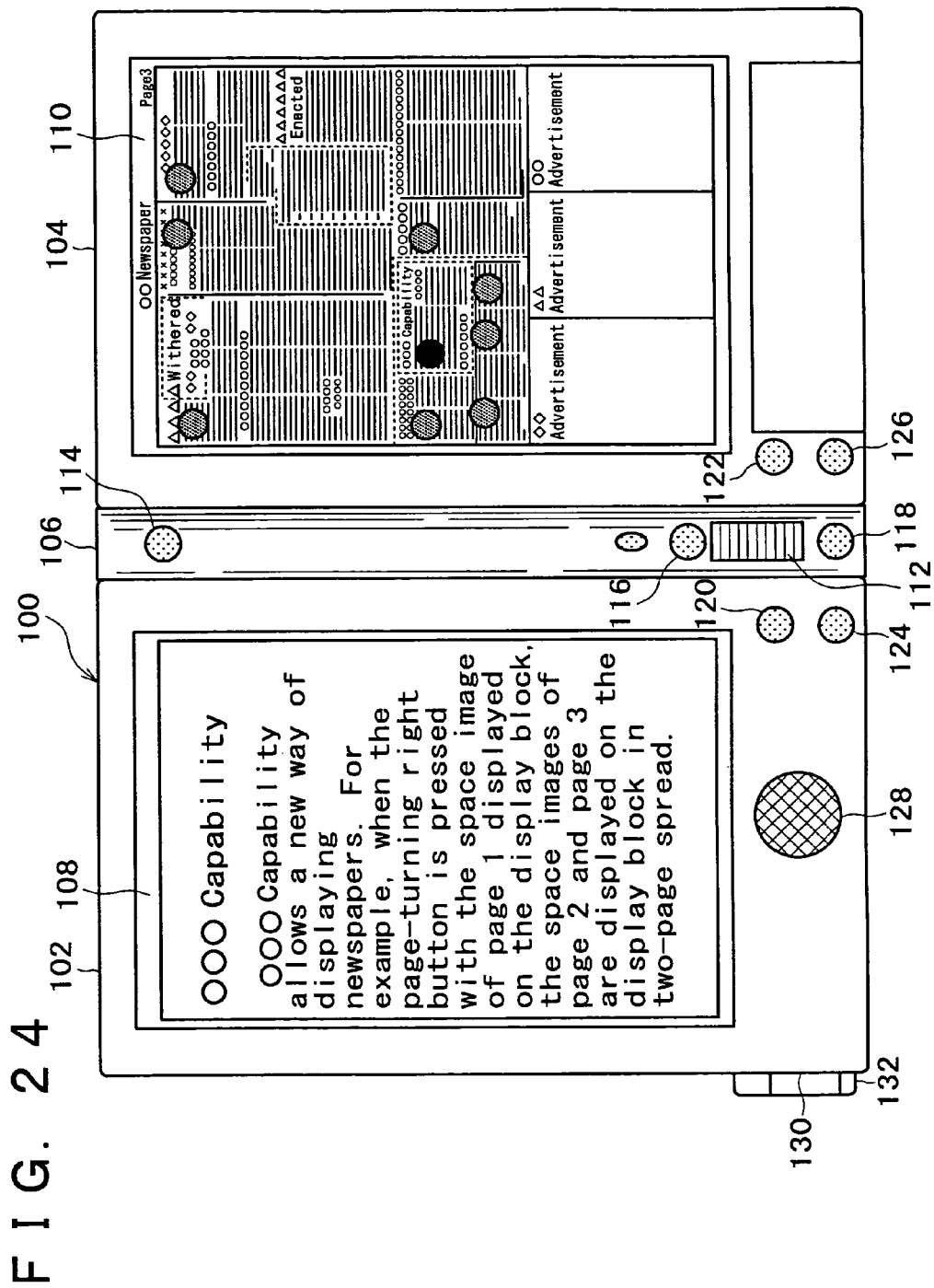
FIG. 24 is a diagram illustrating still another exemplary screen display on the display block by news-item contents zoom-in control in the above-mentioned embodiment.

According to this news-item contents zoom-in control, when the left-hand zoom-in button 124 is pressed with the window for displaying news-item contents is opened on the left-hand display block 108 for example as shown in FIG. 23, the text of the news-item contents displayed in the window is magnified as shown in FIG. 24. Thus, the text of the news-item contents in the window may be magnified, thereby making the text easier to read.

The following describes a second embodiment of the present invention with reference to drawings. In the second embodiment, components similar to those previously described in the first embodiment are denoted by the same reference numerals and the detail description thereof will be skipped.

Figure 25:
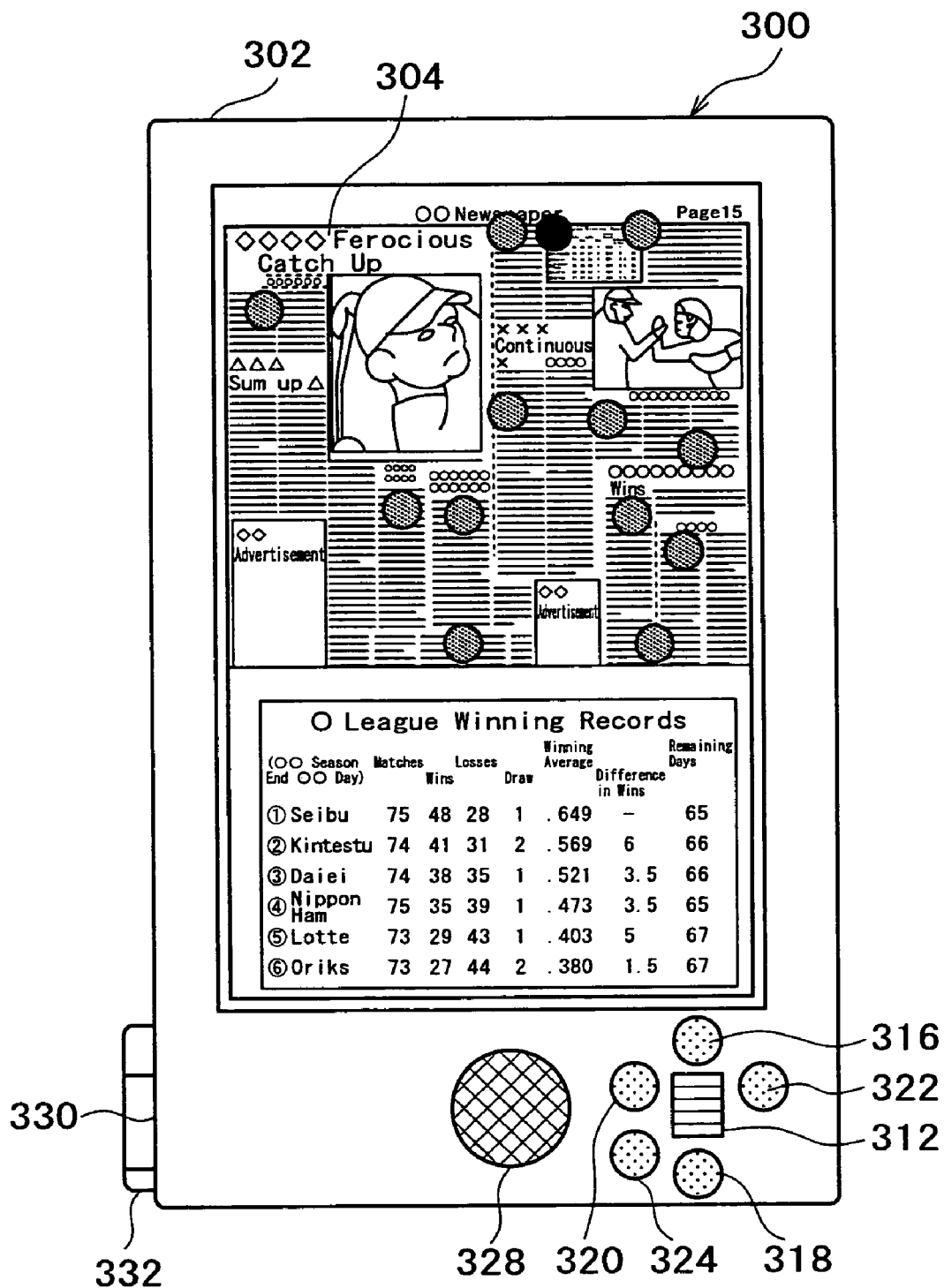
FIG. 25 is a diagram illustrating an external configuration of a mobile information terminal apparatus practiced as a second embodiment of the invention.

In the second embodiment, an example in which the present invention is applied to a mobile information terminal apparatus 300 having a single display block as shown in FIG. 25 is described. The mobile information terminal apparatus 300 has a single display block 304 as one example of a display means on a case 302.

Below the case 302, a jog lever 312, a backward button 316, a forward button 318, a page-turning left button 320, a page-turning right button 322, and a zoom-in button 324 are arranged as one example of operation means. A speaker 328 is also arranged below the case 302.

On one side end of the case 302, an electronic information interface 330 is arranged. The electronic information interface 330 is detachably loaded with an electronic information recording medium 332 constituted by a semiconductor memory such as a memory card recorded with electronic information of newspapers and magazines for example. It should be noted that the electronic information interface 330 may also be configured such that the electronic information interface 330 is connected to a network such as the Internet for example in a wired or wireless manner to receive the electronic information from the web pages or the like.

The jog lever 312, the backward button 316, the forward button 318, the page-turning left button 320, the page-turning right button 322, the zoom-in button 324, and the speaker 328 correspond to the jog lever 112, the backward button 116, the forward button 118, the page-turning left button 120, the page-turning right button 122, the zoom-in button 124, and the speaker 128 respectively of the mobile information terminal apparatus 100 in the first embodiment and have each generally the same function.

For example, in the mobile information terminal apparatus 300, a page space image is displayed on the display block 304 on the basis of the electronic information of newspapers and magazines captured from the electronic information interface 330. When the page-turning right button 122 is pressed, the page space image of the next page is displayed. When the page-turning left button 120 is pressed, the page space image of the previous page is displayed. However, unlike the mobile information terminal apparatus 100 associated with the first embodiment, there is only one display block 304 on the mobile information terminal apparatus 300, so that the page space images of a newspaper or a magazine are displayed, page by page.

When the jog lever 312 is switched on downward with a page space image displayed, a news-item button is displayed in each news-item partition on the page space image. As with the first embodiment, the news-item button in the upper left corner is displayed as selection candidate. Every time the jog lever 312 is switched on downward in this state, candidate selection display shifts down to other news-item buttons. When the jog lever 312 is pressed in the push direction, the window is displayed and the news-item contents information corresponding to the news-item button selected in candidate in that window is displayed in text for example. Thus, the application of the present invention to the mobile information terminal apparatus 300 having only one display block brings about the same effects as those of the first embodiment.

Figure 26:
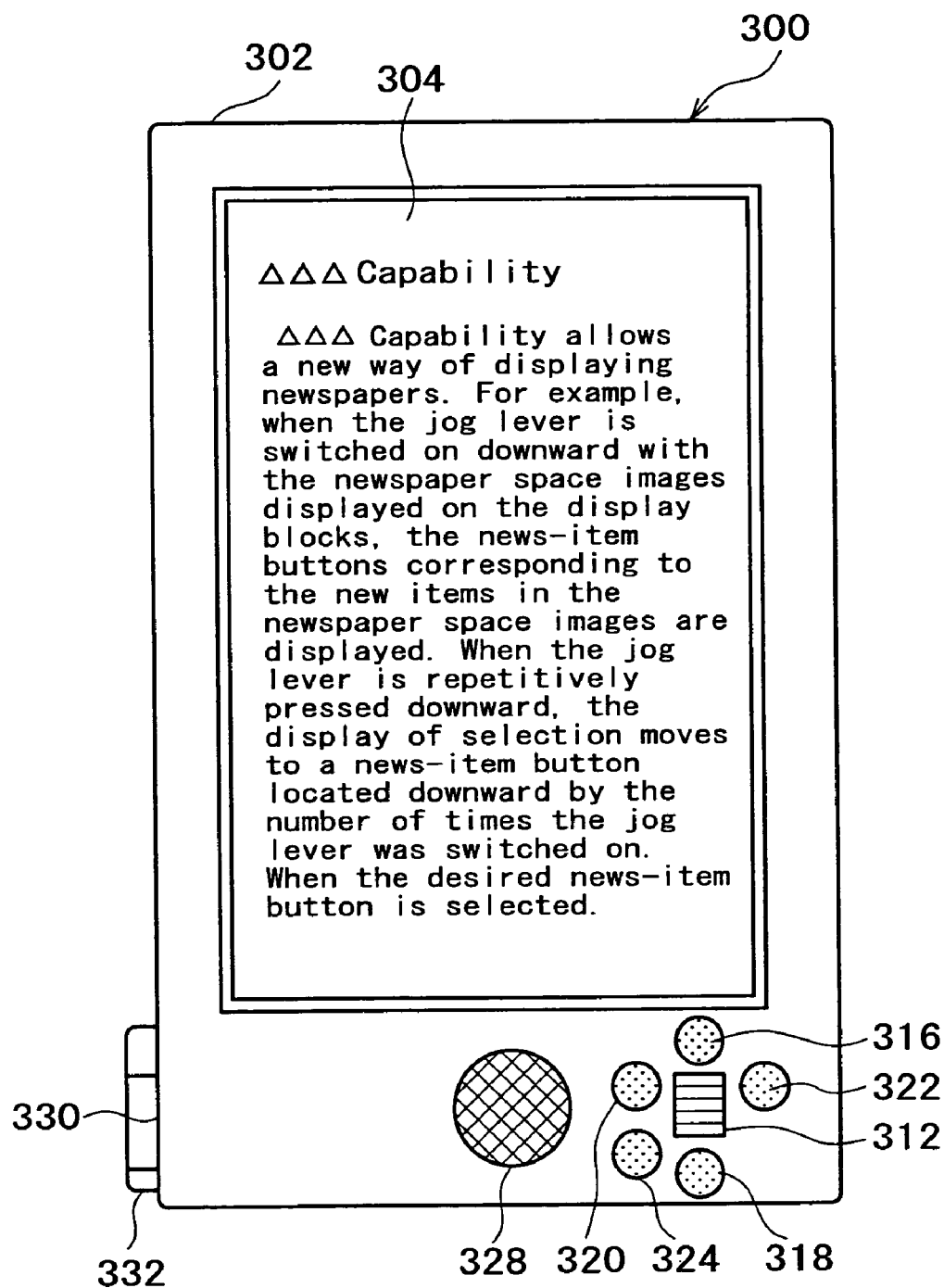
FIG. 26 is a diagram illustrating an exemplary display screen on the display block of the second embodiment.

The above-mentioned window for displaying news-item contents may be displayed in one portion of the display block 304 as shown in FIG. 25 or all over the display block 304 as shown in FIG. 26. When the window is displayed in one portion on the display block 304, the window may also be displayed such that the window does not overlap the page space image on which the selected news-item button is displayed. This setup allows the reader to read the news-item contents while viewing the page space image of the news-item in which the news-item contents are displayed, thereby reading the news-item contents by understanding their importance.

It should be noted that, when the page-turning right button 122 is pressed with the window displayed as shown in FIG. 26, the next page of the news-item is displayed in the window, and when the zoom-in button 324 is pressed, the text of news-item contents in the window is displayed in an enlarged size. Consequently, the news-item may be read with easy to read character size.

While the preferred embodiments of the present invention have been described using specific terms, such description is for illustrative purposes only, and it is to be understood that changes and variations may be made without departing from the spirit or scope of the appended claims.

For example, according to the above-mentioned embodiments, in addition to the mobile information terminal apparatuses such as PDAs and mobile phones, the present invention is applicable to electronic books and the like.

The electronic information to be displayed may also captured from semiconductor memories such as memory cards via the electronic information interface 130. Alternatively, the electronic information may be captured from Web pages for example by connecting the embodiments to a network such as the Internet for example via the electronic information interface 130 in a wired or wireless manner.

What is claimed is:

1. An electronic information display apparatus comprising:
   display means for displaying an image based on electronic information at least having image information of a page space having a plurality of partitions of news items and news-item contents information associated with each of said plurality of partitions of news items;
   operation means for executing information display onto said display means;
   image information display control means for displaying an image of said page space image information among said electronic information onto said display means;
   news-item marker display control means for displaying news-item markers each corresponding to each of said news items in said page space image information displayed on said display means in response to an operation executed through said operation means; and
   news-item contents information display control means for if a desired one of said news-item markers is selected from among said displayed news-item markers by an operation executed through said operation means, displaying onto said display means an image of said news-item contents information associated with the news-item partition in which said selected news-item marker is displayed,
   wherein said image information display control means displays said image of said page space image information among said electronic information onto said display means without said news-item markers until said operation is executed through said operation means.

2. The electronic information display apparatus according to claim 1, wherein said news-item marker display control means displays each of said news-item markers in each of said plurality of news-item partitions in said page space image information displayed on said display means.

3. The electronic information display apparatus according to claim 2, wherein said news-item marker display control means displays each of said news-item markers a predetermined distance from header of each news item.

4. The electronic information display apparatus according to claim 1, wherein said operation means has a jog lever having a switch which is operated upward, downward, and in a push direction; said news-item marker display control means displays said news-item markers when said jog lever is switched upward or downward with a screen based on said page space image information displayed on said display means and, every time said jog lever is switched upward or downward, shifts candidate selection display to another of said news-item markers with one of them displayed as a selection candidate; and said news-item contents information display control means, when said jog lever is switched in the push direction, determines that the news-item marker displayed as selection candidate at that moment has been selected and displays the news-item contents information indicated by said selected news-item marker onto said display means.

5. The electronic information display apparatus according to claim 1, wherein said operation means has a zoom-in button and a zoom-in display control means which, when said zoom-in button is pressed with an image of said news-item contents information displayed on said display means by said news-item contents information display control means, displays said image of said news-item content information in a magnified manner.

6. The electronic information display apparatus according to claim 1, wherein said display means has two display screens and said image information display control means displays images of said page space image information onto said two display screens in a two-page spread manner.

7. The electronic information display apparatus according to claim 6, wherein said news-item contents information display control means displays said image of said news-item contents information onto one of the two display screens of said display means, which is other display screen from the display screen on which said news-item markers are displayed.

8. The electronic information display apparatus according to claim 6, wherein said operation means has a page-turning button and said image information display control means, when said page-turning button is pressed, sequentially displays the images of the subsequent page space image information onto said two display screens in a two-page spread manner.

9. The electronic information display apparatus according to claim 1, wherein said display means has one display screen and said news-item contents information display control means displays a window in one portion of said display screen in said display means and displays an image of said news-item contents information into said window.

10. The electronic information display apparatus according to claim 1, wherein said electronic information is captured from a semiconductor memory.

11. The electronic information display apparatus according to claim 1, wherein said electronic information is captured via a network.

12. The electronic information display apparatus according to claim 1, wherein said electronic information display apparatus is a display apparatus of a mobile information terminal apparatus.

13. The electronic information display apparatus according to claim 1, wherein said electronic information display apparatus is a display apparatus of an electronic book.

14. An electronic information display method comprising the steps of:

image information displaying step for displaying, among electronic information at least having image information of a page space having a plurality of partitions of news items and news-item contents information associated with each of said plurality of partitions of news items, an image of said page space image information onto display means without news-item markers;

news-item marker display control step for displaying news-item markers each corresponding to each of said news items in said page space image information displayed on said display means in response to an operation executed through operation means; and news-item contents information display control step for displaying, if desired one of said news-item markers is selected from among said plurality of displayed news-item markers by an operation executed through said operation means, onto said display means an image of said news-item contents information associated with the news-item partition in which said selected news-item marker is displayed.

15. The electronic information display method according to claim 14, wherein the news-item marker display control step displays each of said news-item markers in each of said plurality of news-item partitions in said page space image information displayed on said display means.

16. The electronic information display method according to claim 15, wherein the news-item marker display control step displays each of said news-item markers a predetermined distance from a header of each news item.

17. The electronic information display method according to claim 14, wherein said operation means has a jog lever having a switch which is operated upward, downward, and in a push direction; the news-item marker display control step displays said plurality of news-item markers when said jog lever is switched upward or downward with a screen based on said page space image information displayed on said display means and, every time said jog lever is switched upward or downward, shifts candidate selection display to another of said news-item markers with one of them displayed as a selection candidate; and the news-item contents information display control step, when said jog lever is switched in the push direction, determines that the news-item marker displayed as selection candidate at that moment has been selected and displays the news-item contents information indicated by said selected news-item marker onto said display means.

18. The electronic information display method according to claim 14, wherein said operation means has a zoom-in button and a zoom-in display control step which, when said zoom-in button is pressed with an image of said news-item contents information displayed on said display means by the news-item contents information display control step, displays said image of said news-item content information in a magnified manner.

19. The electronic information display method according to claim 14, wherein said display means has two display screens and the image information display control step displays images of said page space image information onto said two display screens in a two-page spread manner.

20. The electronic information display method according to claim 19, wherein the news-item contents information display control step displays said image of said news-item contents information onto one of the two display screens of said display means, which is other display screen from the display screen on which said news-item markers are displayed.

21. The electronic information display method according to claim 19, wherein said operation means has a page-turning button and the image information display control step, when said page-turning button is pressed, sequentially displays the images of the subsequent page space image information onto said two display screens in a two-page spread manner.

22. The electronic information display method according to claim 14, wherein said display means has one display screen and said news-item contents information display control step displays a window in one portion of said display screen in said display means and displays an image of said news-item contents information into said window.

23. A computer-readable program for having a computer execute the steps of:

image information displaying step for displaying, among electronic information at least having image information of a page space having a plurality of partitions of news items and news-item contents information associated with each of said plurality of partitions of news items, an image of said page space image information onto display means without news-item markers;

news-item marker display control step for displaying news-item markers each corresponding to each of said news items in said page space image information displayed on said display means in response to an operation executed through operation means; and news-item contents information display control step for displaying, if desired one of said news-item markers is selected from among said displayed news-item markers by an operation executed through said operation means, onto said display means an image of said news-item contents information associated with the news-item partition in which said selected news-item marker is displayed.

24. A recording medium recording a computer-readable program for displaying electronic information, said program has computer execute the steps of:

image information displaying step for displaying, among electronic information at least having image information of a page space having a plurality of partitions of news items and news-item contents information associated with each of said plurality of partitions of news items, an image of said page space image information onto display means without news-item markers;

news-item marker display control step for displaying news-item markers each corresponding to each of said news items in said page space image information displayed on said display means in response to an operation executed through operation means; and news-item contents information display control step for displaying, if desired one of said news-item markers is selected from among said displayed news-item markers by an operation executed through said operation means, onto said display means an image of said news-item contents information associated with the news-item partition in which said selected news-item marker is displayed.

25. An electronic information display apparatus comprising:

a display configured to display an image based on electronic information at least having image information of a page space having a plurality of partitions of news items and news-item contents information associated with each of said plurality of partitions of news items;

a operation controller configured to control information display onto said display;

an image information display controller configured to display an image of said page space image information among said electronic information onto said display;

a news-item marker display controller configured to display news-item markers each corresponding to each of said news items in said page space image information displayed on said display in response to an operation executed through said operation controller; and a news-item contents information display controller configured to display onto said display an image of said news-item contents information associated with the news-item partition in which said selected news-item marker is displayed if a desired one of said news-item markers is selected from among said displayed news-item markers by an operation executed through said operation controller, wherein said image information display controller is configured to display said image of said page space image information among said electronic information onto said display without said news-item markers until said operation is executed through said operation controller.

* * * * *